(12) United States Patent
Terahai et al.

(10) Patent No.: US 11,243,171 B2
(45) Date of Patent: Feb. 8, 2022

(54) CERAMIC BODY DEFECT INSPECTING APPARATUS AND CERAMIC BODY DEFECT INSPECTING METHOD

(71) Applicant: NGK Insulators, Ltd., Nagoya (JP)

(72) Inventors: Takafumi Terahai, Nagoya (JP); Akihiro Mizutani, Ichinomiya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/061,750

(22) Filed: Oct. 2, 2020

(65) Prior Publication Data

US 2021/0018446 A1 Jan. 21, 2021

Related U.S. Application Data

(63) Continuation of application No. PCT/JP2019/011696, filed on Mar. 20, 2019.

(30) Foreign Application Priority Data

May 7, 2018 (JP) .............................. JP2018-089408

(51) Int. Cl.
*G01N 21/88* (2006.01)
*G01N 21/95* (2006.01)

(52) U.S. Cl.
CPC ..... *G01N 21/8806* (2013.01); *G01N 21/8851* (2013.01); *G01N 21/95* (2013.01)

(58) Field of Classification Search
CPC . G01N 21/8806; G01N 21/8851; G01N 21/95
See application file for complete search history.

(56) References Cited

U.S. PATENT DOCUMENTS

2006/0151926 A1 7/2006 Zoeller, III
2010/0238281 A1 9/2010 Akao et al.
(Continued)

FOREIGN PATENT DOCUMENTS

JP 2007-333579 A1 12/2007
JP 2008-139052 A1 6/2008
(Continued)

OTHER PUBLICATIONS

International Search Report and Written Opinion (Application No. PCT/JP2019/011696) dated Jun. 18, 2019.

*Primary Examiner* — Jamil Ahmed
(74) *Attorney, Agent, or Firm* — Burr & Brown, PLLC

(57) ABSTRACT

A plurality of illumination elements obliquely irradiating an inspection target region in irradiation directions different from each other and equiangularly spaced around an image capturing part in a state where each of a low-angle, intermediate-angle, and high-angle illumination parts has a different irradiation angle are sequentially turned on and off. An image of the image captured region is captured every time each of the plurality of illumination elements is turned on. A determination image generation part specifies an inspection-excluded region based on at least one of maximum luminance image data and minimum luminance image data of three types of captured image data each corresponding to an irradiation angle of each illumination part and generates determination image data for the image captured region other than the inspection-excluded region. A defect determination part determines existence of a defect based on the determination image data.

19 Claims, 24 Drawing Sheets

(56) References Cited

U.S. PATENT DOCUMENTS

2018/0238683 A1  8/2018  Watanabe et al.
2019/0265172 A1  8/2019  Koseki et al.

FOREIGN PATENT DOCUMENTS

| JP | 2010-249798 | A1 | | 11/2010 | |
|----|----|----|----|----|----|
| JP | 2013-024561 | A1 | | 2/2013 | |
| JP | 2013024561 | A | * | 2/2013 | ....... G01N 21/95692 |
| JP | 2014-009970 | A1 | | 1/2014 | |
| WO | 2017/073628 | A1 | | 5/2017 | |
| WO | 2018/088552 | A1 | | 5/2018 | |

\* cited by examiner

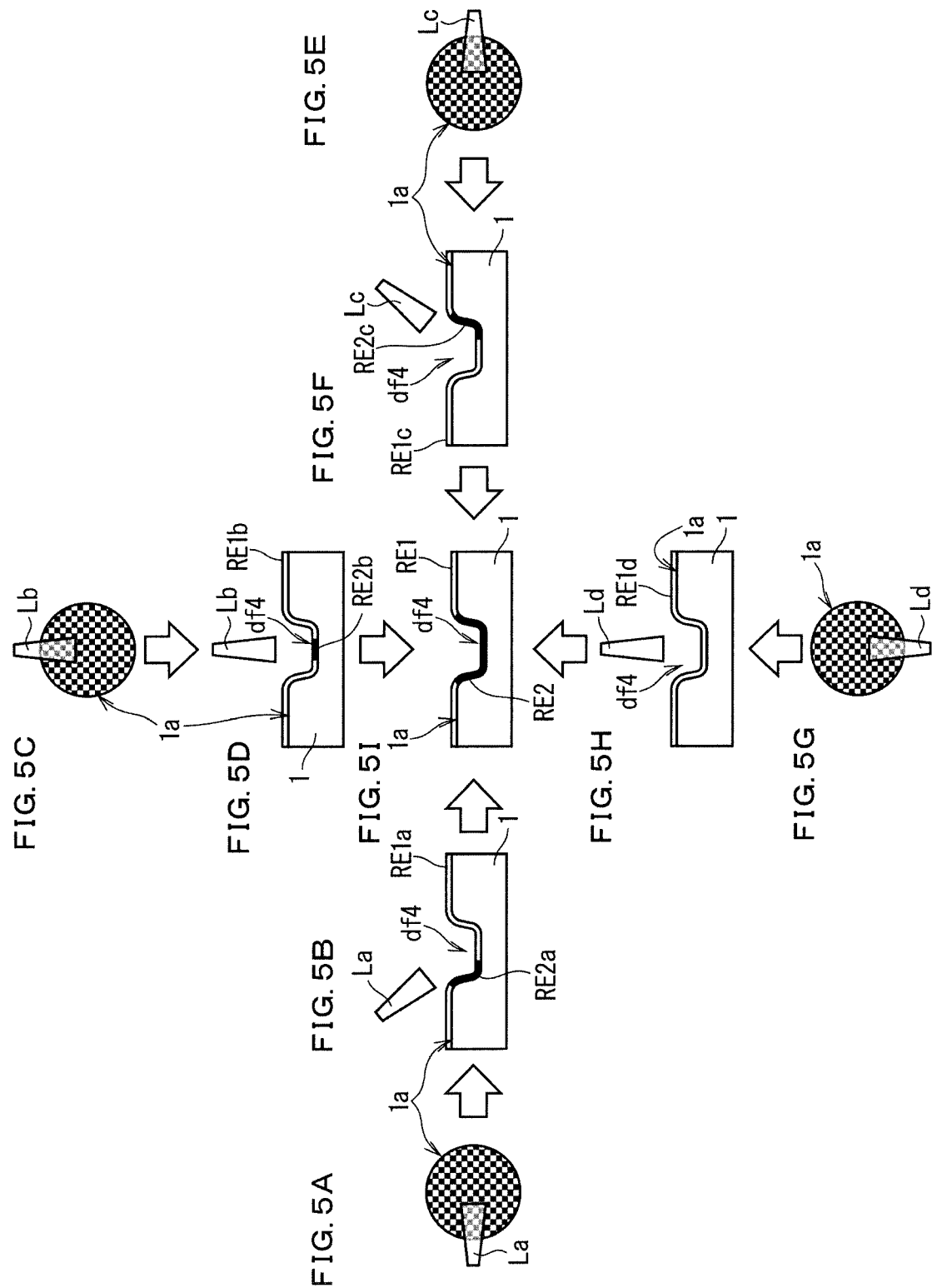

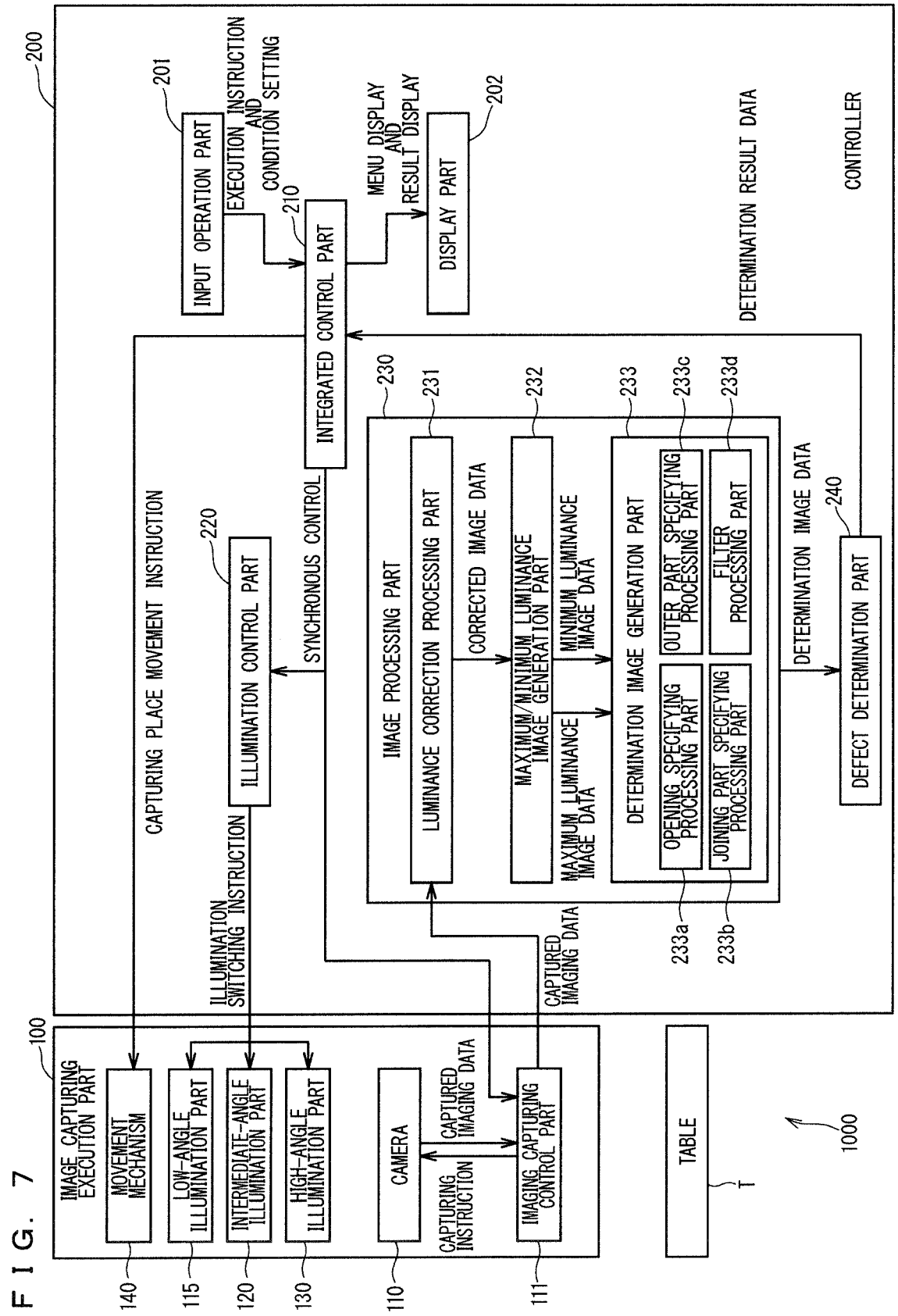

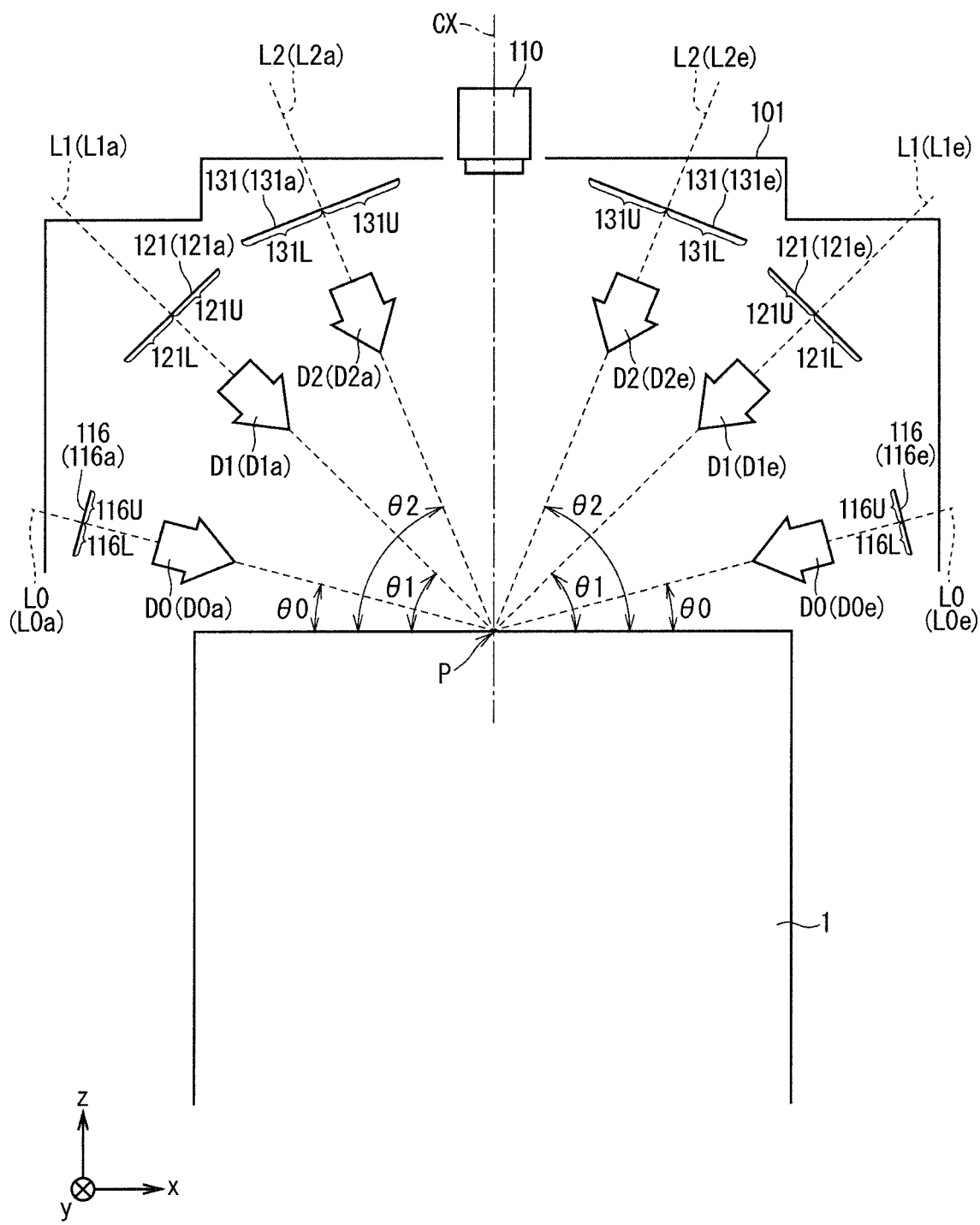
F I G. 9

FIG. 11A
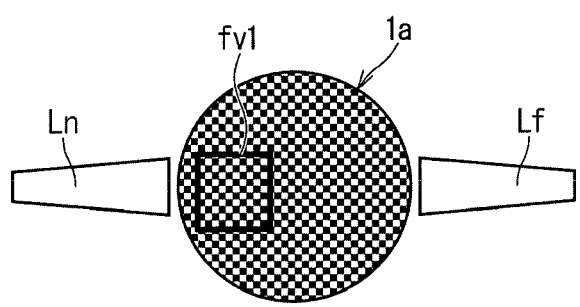
FIG. 11B
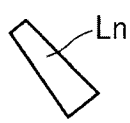
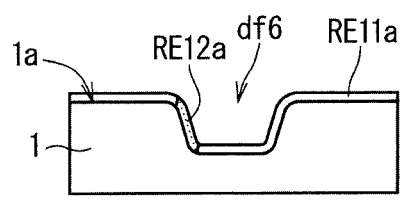
FIG. 11C
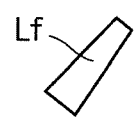
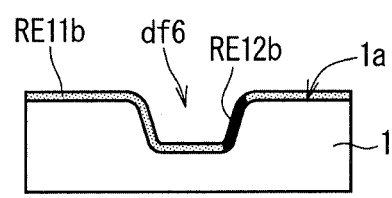

FIG. 25

| | SHAPE | SURFACE IRREGULARITY | CRACK | SHALLOW SCOOP AND CHIP | DEEP SCOOP AND CHIP |
|---|---|---|---|---|---|
| LOW-ANGLE DETERMINATION PROCESSING | LOW-ANGLE ILLUMINATION TURNED ON | D0, ns, A | D0, df1, B | D0, df3a, C | D0, df3b, D |
| | LOW-ANGLE DETERMINATION IMAGE | TH0, A' | TH0, df1, B' | TH0, df3a, C' | TH0, df3b, D' |
| | DETERMINATION | OK | (OK) | NG | NG |
| INTERMEDIATE -ANGLE DETERMINATION PROCESSING | INTERMEDIATE -ANGLE ILLUMINATION TURNED ON | D1, ns, A | D1, df1, B | D1, df3a, C | D1, df3b, D |
| | INTERMEDIATE -ANGLE DETERMINATION IMAGE | TH1, A' | TH1, df1, B' | TH1, TH1, df3a, C', C' | TH1, df3b, D' |
| | DETERMINATION | OK | (OK) | (OK) | NG |
| HIGH -ANGLE DETERMINATION PROCESSING | HIGH -ANGLE ILLUMINATION TURNED ON | D2, ns | D2, df1, B | D2, df3a | D2, df3b |
| | HIGH -ANGLE DETERMINATION IMAGE | | TH1, df1, B' | | |
| | DETERMINATION | OK | NG | (OK) | (OK) |
| COMPREHENSIVE DETERMINATION | | OK | NG | NG | NG |

CERAMIC BODY DEFECT INSPECTING APPARATUS AND CERAMIC BODY DEFECT INSPECTING METHOD

TECHNICAL FIELD

The present invention relates to an apparatus and method that inspect existence of a defect on an outer surface of a ceramic body, and particularly relates to an apparatus and a method suitable to inspection of an end face of a honeycomb structural body.

BACKGROUND ART

A honeycomb structural body that is a ceramic porous body (ceramic body) is widely used as a filter that collects particulate matter contained in exhaust gas from an internal combustion, a boiler, or the like, or as a catalyst carrier of an exhaust gas cleaning catalyst. The honeycomb structural body includes a plurality of cells, partitioned by partition walls, along the axial direction of the structural body respectively, and surround by a tubular outer surface (outer wall). The ceramic honeycomb structural body is excellent in thermal resistance, thermal shock resistance, and oxidation resistance, and thus widely used for the above-mentioned applications and the like.

In some honeycomb structural bodies, cell openings at both end faces are alternately (in a checkerboard pattern) sealed (also referred to as sealing) (sealed honeycomb structural bodies). Such a sealed honeycomb structural body is used for, for example, DPF (diesel particulate filter).

A ceramic honeycomb structural body is typically manufactured by shaping, through extrusion molding, clay-like raw earth obtained by kneading powder of ceramic (for example, cordierite, SiC, or alumina) as a constituent material thereof with, for example, an organic binder and water, and by firing a honeycomb shaped body thus obtained. When sealing is desired to be added, it may be implemented, for example, in a manner that an end part of a honeycomb fired body in which a cell not to be sealed has been masked in advance is immersed in a slurry filler to fill an opened cell with the filler and then the honeycomb fired body is fired again (refer to Japanese Patent Application Laid-Open No. 2010-249798, for example). Alternatively, it is also possible that a honeycomb shaped body without sealing is filled with the filler as described above and then is fired, thereafter to obtain a sealed honeycomb structural body.

Some ceramic honeycomb structural bodies are made by joining a plurality of honeycomb segments each having a plurality of cells. Such a ceramic honeycomb structural body can be manufactured by generating shaped bodies of a plurality of honeycomb segments by extrusion molding in the manner similar to the case described above and firing a honeycomb shaped body (honeycomb segment collected body) obtained by joining the shaped bodies.

A honeycomb structural body manufactured by the method described above is inspected to check that no defect such as a crack, a chip, or a scoop exists on a side surface, an end face having an opening, and an internal partition wall, and then shipped as a product.

Japanese Patent Application Laid-Open No. 2010-249798 discloses, as a method of inspecting a sealed part of a sealed honeycomb structural body, a method of image capturing for a cell from one end face side while emitting light thereto on the other end face side, and detecting any defect at the sealed part based on the grayscale (luminance) of light obtained by performing image processing on a captured image thus obtained.

In another publicly known method (refer to Japanese Patent Application Laid-Open No. 2008-139052, for example), a telecentric optical system and a camera having an optical axis aligned with that of the optical system are disposed on the one end part side of the honeycomb structural body in a direction tilted by a predetermined angle relative to the axis line direction of the honeycomb structural body, and the grayscale of an image formed by light obliquely incident on a partition wall is identified to perform crack detection at the partition wall.

When the above-described defect inspection by using the grayscale appearing in a captured image is performed on an end face of a honeycomb structural body, a defect such as a crack, a chip, or a scoop occurring at the periphery of a cell opening is required to be reliably distinguished from the cell opening itself. In addition, in a case of a sealed honeycomb structural body, in particular, normal irregularities (irregularities that cause no problem in terms of product specifications) existing at a sealed part and a rib part are required not to be falsely detected as a crack, a chip, a scoop, and the like.

For example, it is known that, when oblique illumination as disclosed in Japanese Patent Application Laid-Open No. 2008-139052 is used in defect inspection, a defect part such as a chip or a scoop is likely to be a dark part (shadow), but a shadow is also likely to occur at a normal irregular part, and thus the normal irregular part is highly likely to be falsely detected as a defect at defect detection based on existence of the dark part.

When a defect inspection of a large number of honeycomb structural bodies is performed by image processing, from a viewpoint of inspection efficiency, it is preferable that a part of a inspected region, where it is already known that there is no need for inspection, is excluded from inspection. The reason is that such a process leads to reduction in a calculation time for image processing and suppression of a false detection. For example, when the defect inspection is performed based on the captured image of the honeycomb structural body as is the case in the technique disclosed in Japanese Patent Application Laid-Open No. 2010-249798, the defect inspection needs not be performed on the opening, thus image information of a part of the opening is not necessary. An outer side of the honeycomb structural body is also captured in the captured image depending on a captured position, however, image information of such a part is not also necessary for the defect inspection. In addition, when the honeycomb structural body is made by joining the plurality of honeycomb segments, image information of a joining part is not also necessary for the defect inspection.

SUMMARY

The present invention relates to an apparatus and method that inspect existence of a defect on an outer surface of a ceramic body, and particularly relates to an apparatus and a method suitable to inspection of an end face of a honeycomb structural body.

According to the present invention, a ceramic body defect inspecting apparatus configured to inspect existence of a defect on an outer surface of a ceramic body includes: a table on which a ceramic body as an inspection target is to be placed; an image capturing part configured to capture at least part of an inspection target surface of the ceramic body placed on the table as an image captured region in a normal direction of the inspection target surface; a low-angle illumination part, an intermediate-angle illumination part, and a high-angle illumination part each including a plurality, which is four or more, of illumination elements obliquely irradiating the image captured region with illumination light in irradiation directions different from each other and equiangularly spaced around the image capturing part; a determination image generation part configured to generate determination image data for determining existence of a defect in the image captured region based on captured image data acquired by the image capturing part; and a defect determination part configured to determine existence of a defect based on the determination image data, wherein the plurality of illumination elements included in the low-angle illumination part have an irradiation angle θ0 of 5° to 30°, the plurality of illumination elements included in the intermediate-angle illumination part have an irradiation angle θ1 of 30° to 60°, the plurality of illumination elements included in the high-angle illumination part have an irradiation angle θ2 of 60° to 85°, values of θ0, θ1, and θ2 are different from each other, the plurality of illumination elements are sequentially turned on and off in each of the low-angle illumination part, the intermediate-angle illumination part, and the high-angle illumination part, the image capturing part captures an image of the image captured region every time the plurality of illumination elements in each of the low-angle illumination part, the intermediate-angle illumination part, and the high-angle illumination part are turned on, thereby generating plural pieces of low-angle illumination captured image data, plural pieces of intermediate-angle illumination captured image data, and plural pieces of high-angle illumination captured image data, the determination image generation part includes: the maximum/minimum luminance image generation part generating low-angle maximum luminance image data, intermediate-angle maximum luminance image data, and high-angle maximum luminance image data, by respectively synthesizing the plural pieces of low-angle illumination captured image data, the plural pieces of intermediate-angle illumination captured image data, and the plural pieces of high-angle illumination captured image data so that a maximum luminance value for each pixel position in the plural pieces of the synthesized data is set to a luminance value for the pixel position in the generated data, and generating low-angle minimum luminance image data, intermediate-angle minimum luminance image data, and high-angle minimum luminance image data, by respectively synthesizing the plural pieces of low-angle illumination captured image data, the plural pieces of intermediate-angle illumination captured image data, and the plural pieces of high-angle illumination captured image data so that a minimum luminance value for each pixel position in the plural pieces of the synthesized data is set to a luminance value for the pixel position in the generated data; and an excluded region specifying part specifying an excluded pixel region in an image expressed by each of the low-angle minimum luminance image data, the intermediate-angle minimum luminance image data, and the high-angle minimum luminance image data based on at least one of the low-angle maximum luminance image data, the intermediate-angle maximum luminance image data, the high-angle maximum luminance image data, the low-angle minimum luminance image data, the intermediate angle minimum luminance image data, and the high-angle minimum luminance image data, the excluded pixel region corresponds to a region not inspected in the image captured region, each of low-angle determination image data, intermediate determination image data, and high-angle determination image data is generated as the determination image data based on the low-angle minimum luminance image data, the intermediate-angle minimum luminance image data, and the high-angle minimum luminance image data disabled for the excluded pixel region, and the defect determination part determines existence of a defect in the image captured region other than the excluded pixel region based on the low-angle determination image data, the intermediate-angle determination image data, and the high-angle determination image data.

According to the present invention, the defect which should be originally detected can be reliably detected without erroneously detecting the irregularities on the normal ceramic surface as the defect, and furthermore, the region which needs not be inspected is excluded at the time of generating the determination image data, thus the defect inspection can be performed more effectively.

Preferably, the ceramic body is a honeycomb structural body and the inspection target surface is an end face of the honeycomb structural body, the excluded region specifying part includes at least one of: an opening specifying processing part specifying a pixel position in the determination image data for a cell opening at the end face of the honeycomb structural body in the image captured region; a joining part specifying processing part specifying a pixel position in the determination image data for a joining part of a honeycomb segment at the end face of the honeycomb structural body in the image captured region; and an outer part specifying processing part specifying a pixel position in the determination image data for a part outside the honeycomb structural body in the image captured region.

In this case, the cell opening, the joining part of the honeycomb segment, and the part outside the honeycomb structural body which are or may be located in the end face are excluded from inspection in advance at the time of generating the determination image data in the inspection of the end face of the honeycomb structural body, thus the defect inspection can be performed more effectively.

Accordingly, an object of the present invention is to provide an inspecting method and an inspecting apparatus that reliably and effectively detect a defect on an end face of a ceramic body, particularly an end face of a honeycomb structural body, and reliably suppress false detection of normal surface irregularities as a defect.

BRIEF DESCRIPTION OF DRAWINGS

FIGS. 5A to 5I are diagrams schematically illustrating a situation when the end face 1a of the honeycomb structural body 1 is irradiated with illumination light in several directions.

FIG. 7 is a block diagram illustrating a configuration of a defect inspecting apparatus 1000.

FIG. 9 is a cross-sectional view taken along line A1-A1' in FIG. 8.

FIGS. 11A to 11C are diagrams for description of the influence of difference in the distance from an illumination element to an irradiated position.

FIG. 25 is a diagram for description in more detail of a content of determination processing performed by the defect determination part 240.

DESCRIPTION OF EMBODIMENT(S)

<Honeycomb Structural Body>

Figure 1:
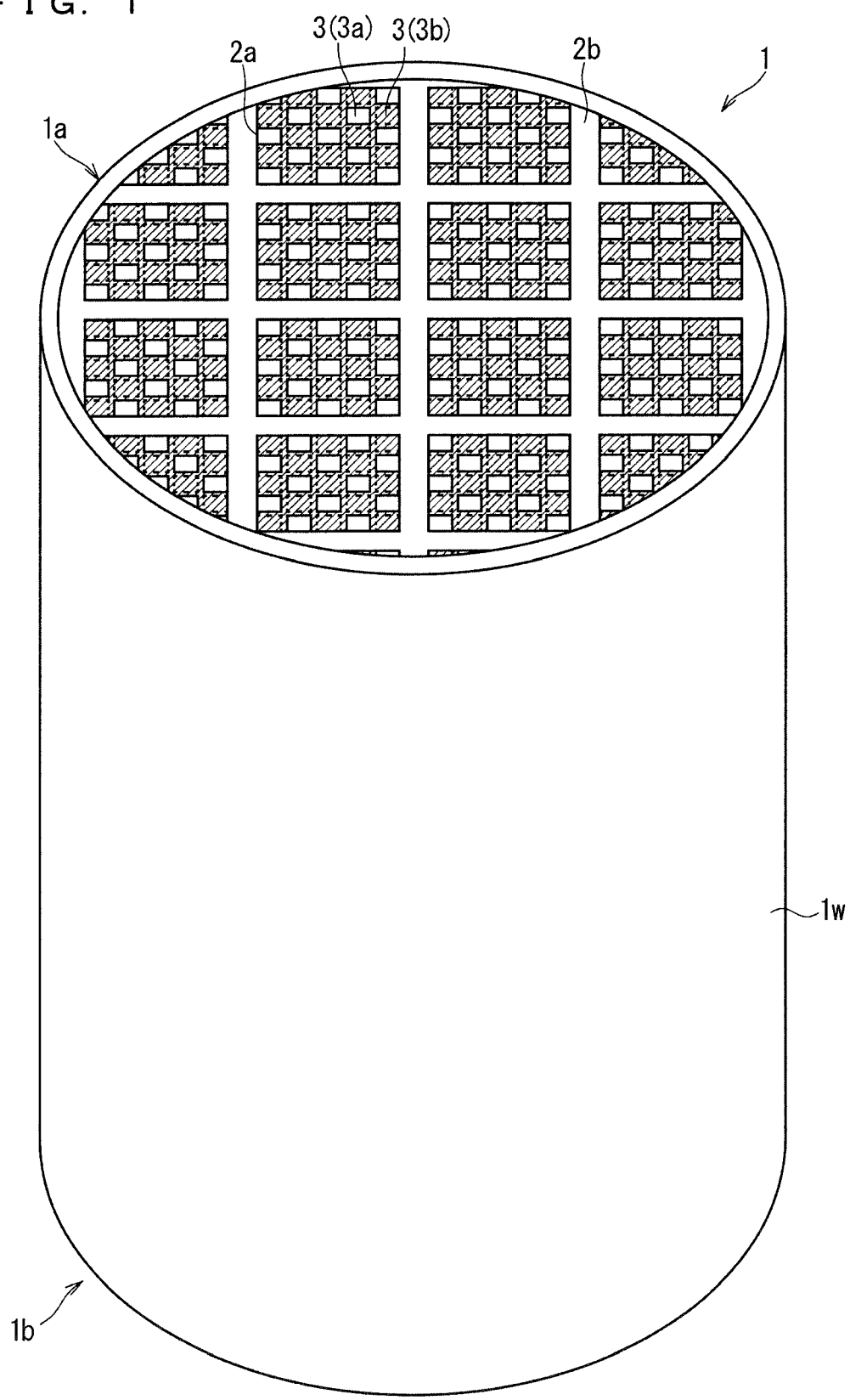
FIG. 1 is an external perspective view of a honeycomb structural body 1.
Figure 2A:
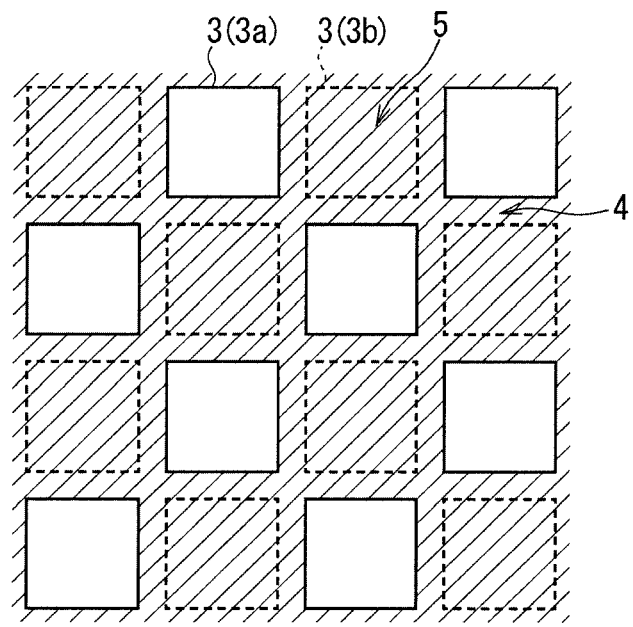
FIGS. 2A and 2B are partially enlarged schematic diagrams of one end face 1a of the honeycomb structural body 1.
Figure 2B:
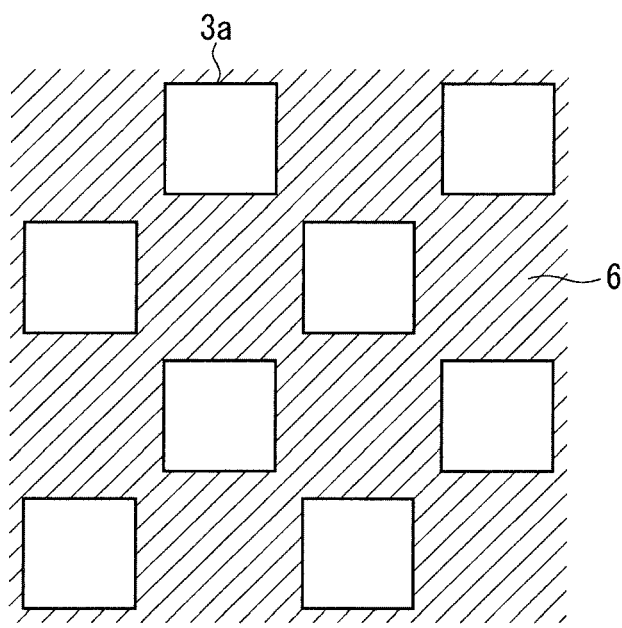

The following first describes a honeycomb structural body having an end face as a defect inspection target in the present embodiment. FIG. 1 is an external perspective view of a honeycomb structural body 1. FIGS. 2A and 2B are a partially enlarged schematic diagrams of one end face 1a of the honeycomb structural body 1.

The honeycomb structural body 1 is a ceramic structural body (ceramic body) having a cylindrical shape and including inside what is called a honeycomb structure. The honeycomb structural body 1 includes a plurality of honeycomb segments 2a disposed in a lattice pattern in an inner side surrounded by the outer wall 1w having a cylindrical shape. The honeycomb segments 2a adjacent to each other are joined by a joining part 2b. Each honeycomb segment 2a includes a plurality of cells 3 having a quadrilateral shape (quadrilateral shape in a cross-sectional view). Each cell 3 is partitioned by a partition 4 (refer to FIG. 2A) and extends in the direction (axial direction) of a central axis of the honeycomb structural body 1. However, the cell 3 may have a beveled prism shape in which the longitudinal direction thereof is tilted relative to the central axis of the honeycomb structural body 1. In any case, the cells 3 are arranged in a two-dimensional square lattice pattern on the end face 1a of the honeycomb structural body 1 in each honeycomb segment 2a. In the present specification, sections of the honeycomb structural body 1 and the cell 3 are sections orthogonal to the central axis of the honeycomb structural body 1 unless otherwise stated.

For example, the outer wall 1w has a thickness of 100 μm to 1500 μm approximately, the joining part 2b has a thickness of 500 μm to 2000 μm approximately, the partition 4 has a thickness of 150 μm to 400 μm approximately, and the pitch of the partition 4, which defines the size of the cell 3, is 1.0 mm to 2.5 mm approximately. A length of the honeycomb structural body 1 in the axial direction is 100 mm to 300 mm approximately, and the radius of a section orthogonal to the axial direction (cross-sectional radius) is 100 mm to 200 mm approximately.

More specifically, the cells 3 include a first cell 3a having an opening at the end face 1a, and a second cell 3b provided with a seal 5 (having an opening which has originally existed but is blocked by the seal 5) on the end face 1a. The first cell 3a and the second cell 3b are arranged alternately (in a checkerboard pattern) in each honeycomb segment 2a. At the other end face 1b, the first cell 3a is sealed, and the second cell 3b is opened. In the following description, the opening of the first cell 3a at the end face 1a is also simply referred to as the first cell 3a.

The honeycomb structural body 1 is a fired body of ceramic (for example, cordierite, SiC, or alumina). A manufacture of the honeycomb structural body 1 is roughly performed as follows.

Firstly, a shaped body of the honeycomb segment 2a is obtained by shaping, through extrusion molding, clay-like raw earth obtained by kneading powder of ceramic as a constituent material thereof with, for example, an organic binder and water into a shape of a honeycomb segment. The plurality of honeycomb segment shaped bodies obtained in the manner described above are joined by a predetermined joining material to obtain a honeycomb shaped body (honeycomb segment collected body). Examples of the joining material include slurry made by kneading a filler such as an inorganic fiber, colloidal silica, clay, or SiC particles with an organic binder, foam resin, a dispersing agent, and water, for example.

Then, the honeycomb shaped body is fired to temporarily manufacture the honeycomb fired body, and subsequently, sealing processing is performed on the honeycomb fired body to form the seal 5 on the cell 3 to be sealed. The seal 5 is formed by, for example, masking an end part of the cell 3 (directed to the first cell 3a) to be provided with no seal 5, then filling the opened cell with the filler through immersion of an end part of the honeycomb fired body in slurry filler containing the same ceramic powder as that used to form the honeycomb fired body, and subsequently firing the honeycomb fired body again.

In FIGS. 1 and 2A, for understanding, a ceramic part of the end face 1a is hatched and the sealed second cell 3b (more specifically, the partition 4 partitioning the second cell 3b) is illustrated with a dashed line. However, in some cases, the seal 5 might be visually recognized to be distinguished from a surrounding at the end face 1a (with no defect) in reality, or as illustrated in FIG. 2B, the first cell 3a might be visually recognized to be arranged in a square lattice pattern on a ceramic surface 6 indicated by hatched lines in FIG. 2B.

Figure 3A:
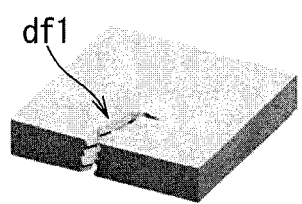
FIGS. 3A to 3D are diagrams for description of a defect that potentially occurs to the end face 1a of the honeycomb structural body 1.
Figure 3B:
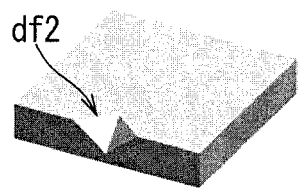
Figure 3C:
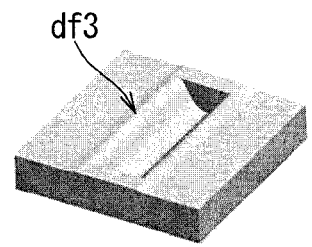
Figure 3D:
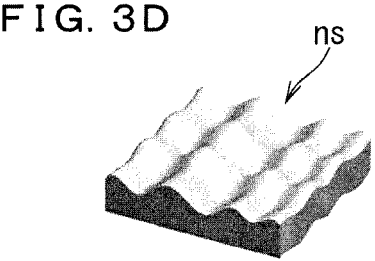
Figure 4:
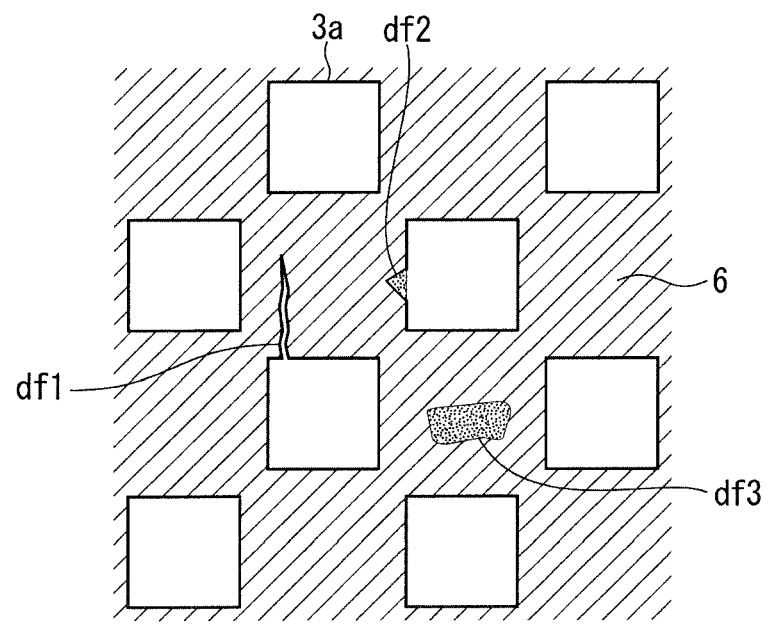
FIG. 4 is a diagram for description of a defect that potentially occurs to the end face 1a of the honeycomb structural body 1.

FIGS. 3A to 3D and FIG. 4 are diagrams for description of a defect that potentially occurs to the end face 1a of the honeycomb structural body 1 formed as described above. The end face 1a includes the joining part 2b, however, in arguing the defect of the end face 1a or defect inspection on the end face 1a, the joining part 2b which is a part not contributing to a function as the honeycomb structural body is excluded. A crack df1, a chip df2, and a scoop df3, which are each a recess on the end face 1a, are exemplarily illustrated as defects that potentially occur to the end face 1a of the honeycomb structural body 1. FIGS. 3A to 3D are perspective views schematically illustrating these defects and normal surface irregularities ns that exist on the normal ceramic surface 6 (without a defect) and cause no problem in terms of product specifications, and FIG. 4 is a top view exemplarily illustrating these defects formed on the ceramic surface 6.

The crack df1 illustrated in FIG. 3A is a crack (rift) formed on the ceramic surface 6 along with, for example, contraction of the honeycomb fired body at firing. The crack df1 formed has a width of 100 µm to 300 µm approximately and a depth of 160 to 1000 µm approximately. The crack df1 is likely to be formed from the first cell 3a (in other words, an end part of the partition 4) opened at the ceramic surface 6 as illustrated in FIG. 4, and is sometimes formed from one first cell 3a to another first cell 3a.

The chip df2 illustrated in FIG. 3B is, for example, a pit formed when part of the ceramic surface 6 lacks (falls) at firing or after firing. The chip df2 formed has a width of 380 µm to 500 µm approximately and a depth of 200 µm to 1000 µm approximately.

The scoop df3 illustrated in FIG. 3C is a concave formed due to a factor such as local anomalous deformation of the ceramic surface 6 at firing. The scoop df3 formed has a width of 700 µm to 1500 µm approximately and a depth of 350 µm to 2000 µm approximately.

FIG. 4 exemplarily illustrates a case in which the chip df2 is formed continuously with the first cell 3a at the end face 1a, and the scoop df3 is formed at a part (part at which the seal 5 is provided) of the ceramic surface 6 separated from the first cell 3a, but the actual formation aspect of the chip df2 and the scoop df3 is not limited thereto. For example, the scoop df3 is formed continuously with the first cell 3a in some cases.

Generally speaking, although the crack df1, the chip df2, and the scoop df3 are concave portions, the crack df1 has a large ratio of the depth relative to the width as compared to the chip df2 and the scoop df3. The chip df2 and the scoop df3 have different formation factors but have approximately equal sizes and do not need to be distinguished from each other at defect inspection to be described later. It is rather important that, the normal ceramic surface 6 (without a defect), which has the surface irregularities ns as illustrated in FIG. 3D at a convex portion interval of 50 µm to 500 µm approximately at a depth of 40 µm to 300 µm approximately, are not wrongly detected as the chip df2 and the scoop df3, since such normal surface irregularities ns cause no problem in terms of product specifications.

Details of inspection of such a defect that occurs to the end face 1a will be described below.

<Basic Concept of Defect Inspection>

The following first describes the basic concept of defect inspection performed in the present embodiment. The defect inspection performed in the present embodiment targets on the end face 1a of the honeycomb structural body 1 having the above-described configuration, and schematically, is inspection of existence of a defect by using the fact that, when the end face 1a is irradiated with illumination light in an oblique direction while a defect exists at the end face 1a, a shadow region (region in which luminance is small as compared to circumference) is formed at the existence position, and has characteristics on the scheme of the irradiation with illumination light and the scheme of generation of an image for determination.

FIGS. 5A to 5I are diagrams schematically illustrating situations when the end face 1a of the honeycomb structural body 1 is irradiated with illumination light in several directions.

FIG. 5A is a schematic top view when the end face 1a is irradiated with illumination light La in an oblique direction in a state in which the honeycomb structural body 1 is disposed so that the end face 1a is substantially horizontal, and FIG. 5B is a schematic sectional view of a section including the irradiation direction of the illumination light La. In this case, if a defect (concave portion) df4 as illustrated in FIG. 5B exists on the end face 1a, most of the end face 1a and the defect df4 becomes an irradiated region RE1a irradiated with the illumination light La, but the vicinity of a slant face on the left side in the defect df4 becomes a shadow region RE2a in which the illumination light La is not incident, depending on the shape (width and depth) of the defect df4 and the irradiation angle (angle of the irradiation direction with respect to a horizontal plane) of the illumination light La.

Similarly, FIG. 5C is a schematic top view when the end face 1a of the honeycomb structural body 1 is irradiated with illumination light Lb, and FIG. 5D is a schematic sectional view including the irradiation direction of the illumination light Lb, in which the honeycomb structural body 1 is disposed in the same manner as that of FIGS. 5A and 5B, respectively. FIG. 5E is a schematic top view when the end face 1a is irradiated with illumination light Lc, and FIG. 5F is a schematic sectional view including the irradiation direction of the illumination light Lc. FIG. 5G is a schematic top view when the end face 1a is irradiated with illumination light Ld, and FIG. 5H is a schematic sectional view including the irradiation direction of the illumination light Ld. However, the illumination light La, Lb, Lc, and Ld have irradiation angles equal to each other, have irradiation directions at an angle of 90° with respect to each other in a horizontal plane, and have irradiation ranges identical to each other.

At irradiation with the illumination light Lb, similarly to the case of irradiation with the illumination light La, while most of the end face 1a and the defect df4 becomes an irradiated region RE1b irradiated with the illumination light Lb, a shadow region RE2b in which the illumination light Lb is not incident comes to exist at a part of the defect df4 on the back side in the drawing plane, which is not explicitly illustrated in the figure.

At irradiation with the illumination light Lc, while most of the end face 1a and the defect df4 becomes an irradiated region RE1c irradiated with the illumination light Lc, the vicinity of a slant face of the defect df4 on the right side in the drawing plane becomes a shadow region RE2c in which the illumination light Lc is not incident.

At irradiation with the illumination light Ld, while most of the end face 1a and the defect df4 becomes an irradiated region RE1d irradiated with the illumination light Ld, a shadow region in which the illumination light Ld is not incident comes to exist at the vicinity of a slant face of the defect df4 on the front side in the drawing plane, which is not explicitly illustrated in the figure.

As just described, when the end face 1a at which the defect df4 exists is irradiated with illumination light in oblique directions different from each other, the positions and shapes of respective shadow regions formed for the defect df4 are different from each other, and do not correspond to the entire defect df4 in any case.

However, in another viewpoint, the fact that the positions and shapes of respective shadow regions are different suggests that the shadow regions provide information on mutually different parts of the defect df4. Based on this viewpoint, shadow regions formed in the cases of FIGS. 5B, 5D, 5F, and 5H are virtually superimposed with each other to obtain FIG. 5I. In this case, the irradiated region RE1 is only a part other than the defect df4, and the defect df4 is a shadow region RE2 as a whole. In other words, the shadow region RE2 is formed in a size close to the actual size of the defect.

This means that, when an image of the end face 1a is subsequently captured while being obliquely irradiated with illumination light in directions different from each other as illustrated in FIGS. 5A, 5C, 5E, and 5G, a synthesized image is generated by synthesizing the captured images so that shadow regions are superimposed on each other, and existence of a defect is determined based on the synthesized image, the certainty of the determination is increased as compared to a case in which the determination is performed by simply using images obtained in irradiation with illumination light in an oblique direction.

FIGS. 5A to 5I exemplarily illustrate an aspect in which irradiation with illumination light is made in four directions at an angle of 90° with respect to each other in a horizontal plane, but this is exemplary, and the irradiation with illumination light may be performed in a larger number of directions.

To be sure, in an aspect in which a plurality of illumination light beams are simultaneously emitted in directions different from each other, such as an aspect in which, for example, the illumination light La and the illumination light Lc emitted from positions facing each other are simultaneously emitted, a place that is otherwise a shadow region when irradiated with one of the illumination light beams is irradiated with the other illumination light so that no shadow region is formed, and thus the aspect does not achieve an effect of increasing the reliability of defect determination based on a shadow region. In other words, in the present embodiment, it is technically meaningful to emit illumination light individually in a plurality of directions different from each other to obtain each image.

FIGS. 6A to 6D are diagrams for description of influence of difference in the irradiation angle of illumination light on defect detection. Typically, when a region in which an irregularity exists is obliquely irradiated with illumination light, a shadow region is less likely to be formed as the irradiation angle is larger and the depth of the irregularity is smaller.

Figure 6A:
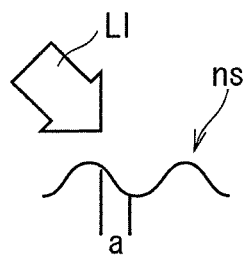
FIGS. 6A to 6D are diagrams for description of the influence of difference in the irradiation angle of illumination light on defect detection.
Figure 6C:
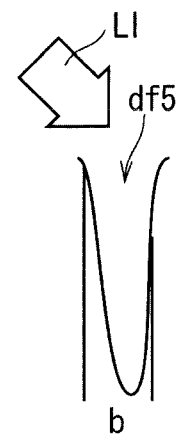
Figure 6B:
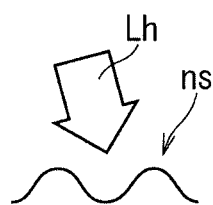

For example, even when irradiation on the surface irregularities ns as a normal irregular part existing on the ceramic surface 6 with illumination light Ll having a relatively small irradiation angle allows part a thereof to serve as a shadow region as illustrated in FIG. 6A, no shadow region is formed in some cases when the same surface irregularities ns as those in FIG. 6A are irradiated with illumination light Lh having an irradiation angle larger than that of the illumination light Ll as illustrated in FIG. 6B.

Figure 6D:
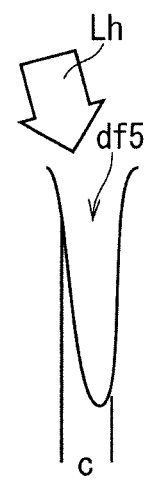

FIGS. 6C and 6D illustrate situations when a part having a crack df5 of a width equivalent to the convex portion interval of the surface irregularities ns existing on the ceramic surface 6 and of a depth larger than the irregularity depth of the surface irregularities ns is irradiated with the illumination light Ll and the illumination light Lh, respectively.

In such a case, as illustrated in FIG. 6C, a part b as a part of the crack df5 is a shadow region at irradiation with the illumination light Ll, and additionally, a part c as a part of the crack df5 is a shadow region at irradiation with the illumination light Lh in some cases as illustrated in FIG. 6D although it is narrower than the part b.

If defect determination is performed based on an image of the end face 1a obtained through irradiation with the illumination light Ll, it is potentially wrongly determined that a defect exists at the position of a shadow region formed at the normal surface irregularities ns. Thus, irradiation with illumination light having a relatively large irradiation angle, such as the illumination light Lh, is preferable to reliably detect the crack df5 only and avoid false detection of the surface irregularities ns as a defect.

However, a chip and a scoop as defects each having a depth smaller and a width larger than those of a crack tend to be unlikely to be detected with a large irradiation angle. Thus, in the present embodiment, reliable determination is achieved by selectively using the irradiation angle of illumination light and determining existence of a defect based on a threshold determined in advance in accordance with characteristics of a dark part appearing in an image of the end face 1a for each angle.

<Defect Inspecting Apparatus>

FIG. 7 is a block diagram illustrating a configuration of a defect inspecting apparatus 1000 performing defect inspection in the present embodiment. The defect inspecting apparatus 1000 according to the present embodiment is distinctive in that the defect inspection based on the basic concept described above can be excellently performed and moreover, a region which should be excluded from the defect inspection can be specified rapidly and reliably.

The defect inspecting apparatus 1000 mainly includes a table T on which the honeycomb structural body 1 as an inspection target is to be placed, an image capturing execution part 100 configured to perform image capturing while irradiating the honeycomb structural body 1 placed on the table T with illumination light, and a controller 200 configured to perform control of the image capturing execution part 100 and defect determination based on a captured image obtained by the image capturing execution part 100.

The image capturing execution part 100 mainly includes a camera (for example, CCD camera) 110 to capture an image of the honeycomb structural body 1 placed on the table T, an image capturing control part 111 as a control part (camera driver) to control image capturing by the camera 110, a low-angle illumination part 115, an intermediate-angle illumination part 120, and a high-angle illumination part 130 each configured to irradiate the honeycomb structural body 1 with illumination light, and a movement mechanism 140 configured to move the image capturing execution part 100 relative to the honeycomb structural body 1 placed on the table T.

Figure 8:
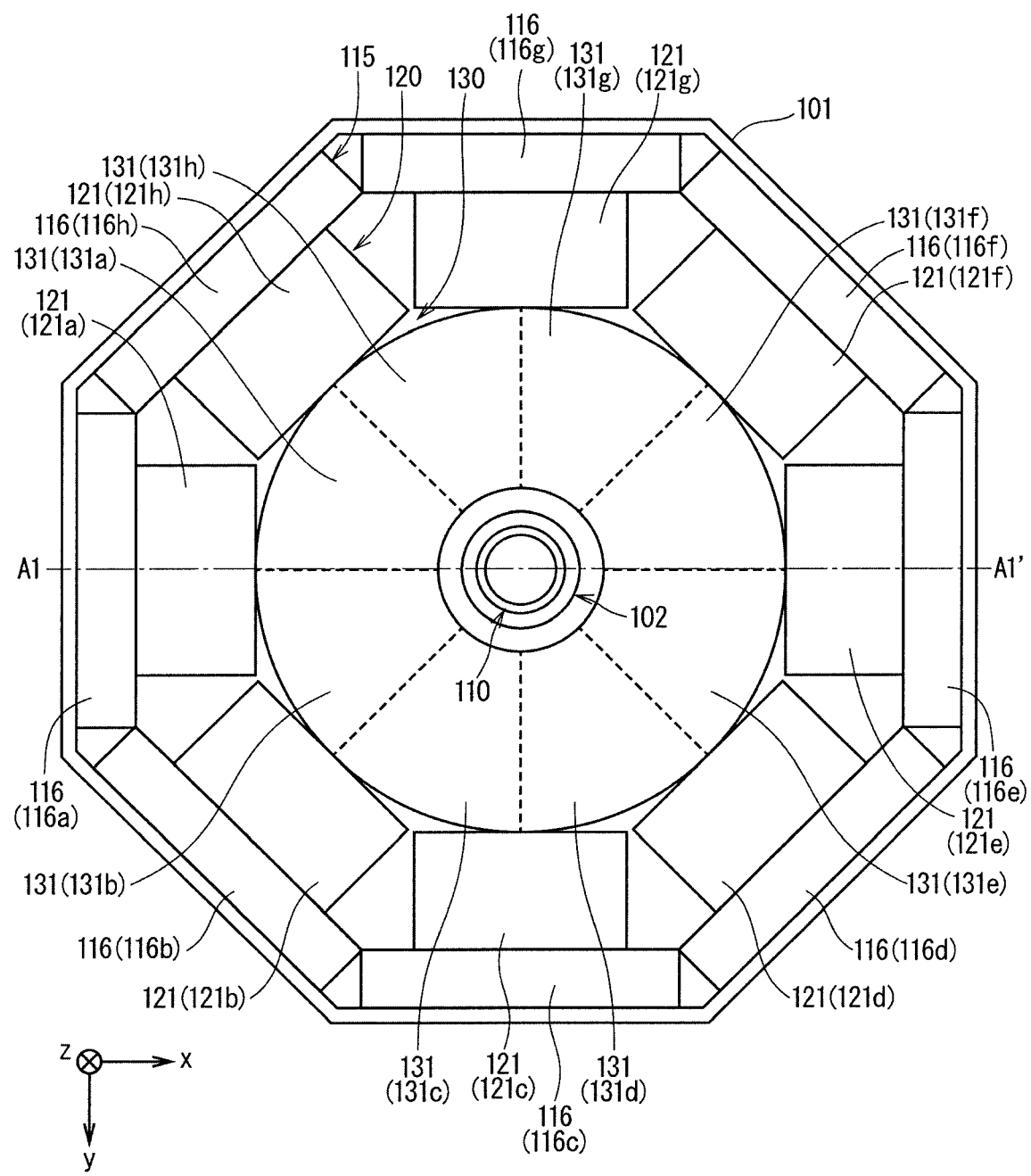
FIG. 8 is a lower surface diagram of a main part of an image capturing execution part 100.

FIG. 8 is a lower surface diagram of a main part of the image capturing execution part 100 (diagram in which the image capturing execution part 100 is viewed upward from below in the vertical direction), and FIG. 9 is a cross-sectional view taken along line A1-A1' in FIG. 8. The A1-A1' section in FIG. 8 is a vertical section including an optical axis CX of the camera 110, is a symmetric plane of a low-angle illumination element 116a, a low-angle illumination element 116e, an intermediate-angle illumination element 121a, and an intermediate-angle illumination element 121e to be described later, is a plane passing between a high-angle illumination element 131a and a high-angle illumination element 131b, and is also a plane passing between a high-angle illumination element 131e and a high-angle illumination element 131f. However, in FIG. 9, for convenience of illustration, the A1-A1' section passes through the high-angle illumination element 131a and the high-angle illumination element 131e.

In addition, to facilitate understanding, FIG. 9 additionally illustrates the honeycomb structural body 1 placed on the table T which itself is not illustrated in FIG. 9. FIGS. 8 and 9 include right-handed xyz coordinates having a z axial direction along the vertical direction. In FIG. 8, an x axial direction is along the right-left direction in the drawing plane, and a y axial direction is along the up-down direction in the drawing plane. Accordingly, FIG. 9, which illustrates the A1-A1' section in FIG. 8, is a zx cross-sectional view.

At inspection, the honeycomb structural body 1 is placed on the table T (not illustrated) so that the end face 1a as an inspection target surface is a horizontal upper surface as illustrated in FIG. 9. In the image capturing execution part 100, the camera 110 is provided in a posture in which the lens thereof points vertically downward and the optical axis CX thereof is aligned with the vertical direction to have a capturing target in the vertically downward direction. Accordingly, the camera 110 can perform image capturing in a predetermined range centered at an intersection point P between the optical axis CX and the end face 1a.

Such configuration that the end face 1a is a horizontal upper surface and the optical axis CX of the camera 110 is aligned with the vertical direction implies that the camera 110 captures an image of the end face 1a as an inspection target surface in the normal direction of the end face 1a.

The image capturing control part 111 is attached to the camera 110, and provides a capturing instruction to the camera 110 and forwards, to the controller 200, captured image data generated through image capturing by the camera 110.

In the defect inspecting apparatus 1000 according to the present embodiment, the three illumination parts of the low-angle illumination part 115, the intermediate-angle illumination part 120, and the high-angle illumination part 130 configured to emit illumination light at irradiation angles different from each other are arranged around the camera 110 on the lower surface of a support body 101 included in the image capturing execution part 100 by appropriate disposition means not illustrated. The camera 110 is inserted into an opening 102 provided to the support body 101 at least at image capturing. The support body 101 on which the camera 110 and each illumination part are disposed is movable by the movement mechanism 140.

More specifically, the low-angle illumination part 115 has a configuration in which m0 (m0≥4) low-angle illumination elements 116 of the same performance, each having the irradiation angle (angle between an irradiation direction D0 and a horizontal plane) θ0 (preferably, θ0=5° to 30°, for example 15°) are equiangularly spaced around the camera 110 in a horizontal plane. FIGS. 8 and 9 exemplarily illustrate a case of m0=8. In other words, FIGS. 8 and 9 exemplarily illustrate a case in which the eight low-angle illumination elements 116 (116a to 116h) are provided. Each low-angle illumination element 116 is attached in a tilt posture to the support body 101 as exemplarily illustrated with the low-angle illumination elements 116a and 116e in FIG. 9. FIGS. 8 and 9 also exemplarily illustrate, as each low-angle illumination element 116, bar illumination in which a large number of LED elements are arrayed in a rectangular shape.

The intermediate-angle illumination part 120 has a configuration in which m1 (m1≥4) intermediate-angle illumination elements 121 of the same performance, each having the irradiation angle (angle between an irradiation direction D1 and a horizontal plane) θ1 (preferably, θ1=30° to 60°, for example, 45°) are equiangularly spaced around the camera 110 in a horizontal plane. FIGS. 8 and 9 exemplarily illustrate a case of m1=8. In other words, FIGS. 8 and 9 exemplarily illustrate a case in which the eight intermediate-angle illumination elements 121 (121a to 121h) are provided. Each intermediate-angle illumination element 121 is attached in a tilt posture to the support body 101 as exemplarily illustrated with the intermediate-angle illumination elements 121a and 121e in FIG. 9. FIGS. 8 and 9 also exemplarily illustrate, as each intermediate-angle illumination element 121, bar illumination in which a large number of LED elements are arrayed in a rectangular shape.

The high-angle illumination part 130 has a configuration in which m2 (m2≥4) high-angle illumination elements 131 of the same performance, each having the irradiation angle (angle between an irradiation direction D2 and a horizontal plane) θ2 (preferably, θ2=60° to 85°, for example, 75°) are equiangularly spaced around the camera 110 in a horizontal plane. However, more specifically, FIGS. 8 and 9 exemplarily illustrate a case with m2=8 in which the high-angle illumination part 130 is provided as ring illumination in which a large number of LED elements are concentrically arrayed in a ring shape, and regions obtained by equally dividing the ring illumination into eight are used as the respective high-angle illumination elements 131 (131a to 131h). Each high-angle illumination element 131 is attached in a tilt posture to the support body 101 as exemplarily illustrated with the high-angle illumination elements 131a and 131e in FIG. 9.

In this manner, m0=m1=m2=8 holds in FIGS. 8 and 9, but m0=m1=m2 is not essential, and at least one of m0 m1, m0 m2, and m1 m2 may hold. In FIG. 8, the arrangement positions of the individual low-angle illumination elements 116 and the intermediate-angle illumination elements 121 are shifted from the arrangement positions of the individual high-angle illumination elements 131 in a direction around the camera 110 in the horizontal plane (circumferential direction) by 22.5°, but this is not essential, and the arrangement positions of the individual low-angle illumination elements 116 and the intermediate-angle illumination elements 121 may coincide with the arrangement positions of the individual high-angle illumination elements 131 in the circumferential direction.

In FIG. 8, the arrangement positions of the individual low-angle illumination elements 116 coincide with the arrangement positions of the individual intermediate-angle illumination elements 121 in the circumferential direction in the horizontal plane, but this is not essential, and their arrangement positions may be shifted from each other, like the relation between the arrangement positions of the intermediate-angle illumination elements 121 and the arrangement positions of the high-angle illumination elements 131 even in a case of m0=m1.

Such configuration that the plurality of low-angle illumination elements 116 provided to the low-angle illumination part 115, the plurality of intermediate-angle illumination elements 121 provided to the intermediate-angle illumination part 120, and the plurality of high-angle illumination elements 131 provided to the high-angle illumination part 130 are separated from each other in the respective horizontal plane, while the honeycomb structural body 1 is placed on the table T so that the end face 1a as an inspection target surface is in a horizontal posture, implies that the plurality of low-angle illumination elements 116, the plurality of intermediate-angle illumination elements 121, and the plurality of high-angle illumination elements 131 are separated from each other in different planes parallel to the end face 1a as an inspection target surface.

More specifically, the upper and lower halves of each illumination element of each illumination part provided to the image capturing execution part 100 are individually dimmable in the defect inspecting apparatus 1000 according to the present embodiment.

Specifically, the upper and lower halves of each low-angle illumination element 116 are a dimming unit 116U and a dimming unit 116L that are individually dimmable, respectively. Specifically, the light quantities of the dimming unit 116U and the dimming unit 116L are individually adjustable. Similarly, an upper dimming unit 121U and a lower dimming unit 121L of each intermediate-angle illumination element 121 are individually dimmable. In addition, an upper dimming unit 131U and a lower dimming unit 131L of each high-angle illumination element 131 are individually dimmable.

Thus, the low-angle illumination elements 116 (116a to 116h), the intermediate-angle illumination elements 121 (121a to 121h), and the high-angle illumination elements 131 (131a to 131h) are each arranged as a whole so that the respective optical axes L0, L1, and L2 pass through the intersection point P between the optical axis CX of the camera 110 and the end face 1a of the honeycomb structural body 1, but the optical axis of each dimming unit is shifted from the intersection point P. Specifically, the optical axes of the dimming units 116L, 121L, and 131L pass through the front side of the intersection point P, and the optical axes of the dimming units 116U, 121U, and 131U pass through the back side of the intersection point P.

Dimming of each dimming unit is performed under control by the illumination control part 220. An LED element having a directivity angle half width of 5° to 30° approximately (for example, 12° when the distance from each illumination element to the intersection point P is 180 mm approximately) is preferably used to individually and excellently perform dimming. However, when the distance from the illumination to the intersection point P is long, the directivity angle half width is preferably small because illumination light spreads before reaching an inspection object. When the distance from the illumination to the intersection point P is short, the directivity angle half width is preferably large.

Figure 10:
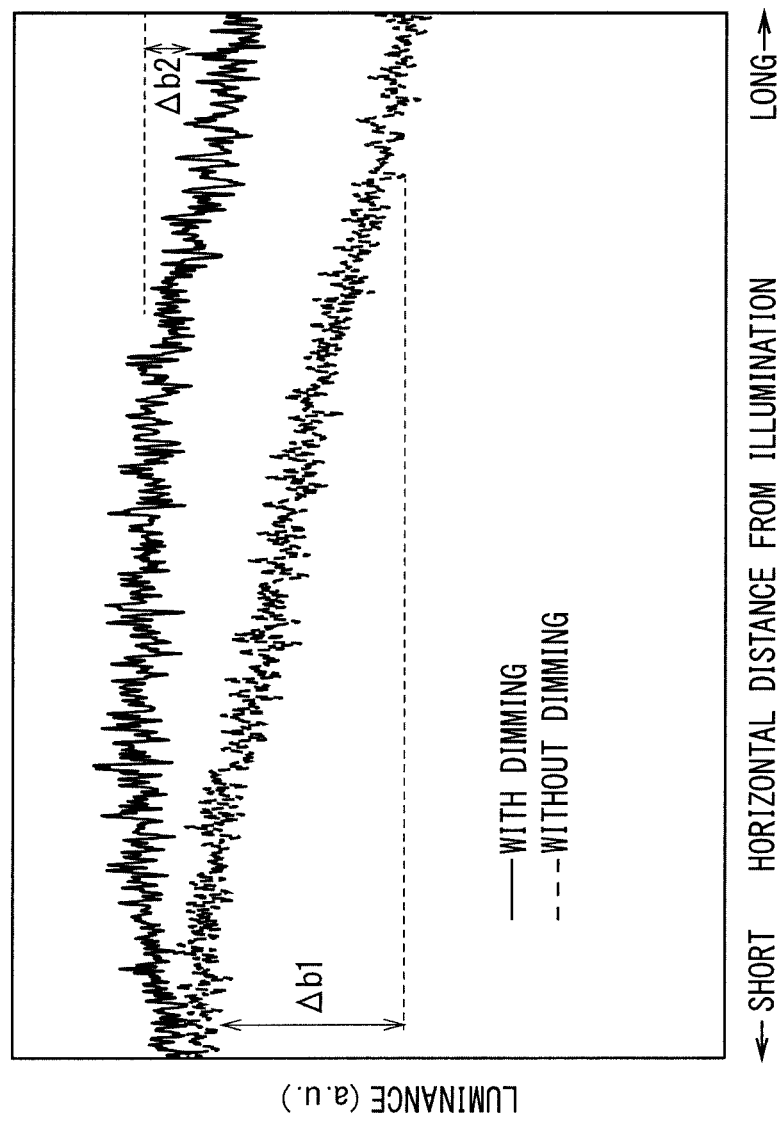
FIG. 10 is a diagram for description of the effect of dimming of each dimming unit.

FIG. 10 is a diagram for description of the effect of dimming (individual dimming) of each dimming unit. Specifically, FIG. 10 is a diagram illustrating the relation between the horizontal distance from the illumination (light source) and the luminance (luminance distribution) when image capturing of a uniform flat surface is performed while the flat surface is irradiated with illumination light from one low-angle illumination element 116 in an oblique direction.

The illuminance of illumination light is inversely proportional to the square of the distance from a light source. Thus, when individual dimming of the dimming units 116L and 116U is not performed, the luminance monotonically decreases as the horizontal distance from the illumination (light source) is larger as illustrated with "without dimming" in FIG. 10. In the case of "without dimming" in FIG. 10, luminance difference Δb1 occurs at both ends of the capturing range (view angle). This is the same also in the case that one illumination element is only dimmable as a whole and individual dimming cannot be performed.

On the other hand, FIG. 10 illustrates, with "with dimming", an example in which individual dimming is performed by the dimming units 116L and 116U, thereby to increase the luminance on a side far from the illumination as compared to that in the case of "without dimming", while the luminance on a side close to the illumination is kept substantially the same as that in the case of "without dimming". Specifically, dimming is performed to relatively increase the light quantity of the upper dimming unit 116U of each low-angle illumination element 116 as compared to the light quantity of the lower dimming unit 116L.

In such a case, the luminance between the side close to the illumination and the middle in the capturing range is substantially constant or slightly larger closer to the middle, and the luminance difference Δb2 at both ends of the capturing range is smaller than the luminance difference Δb1 in the case of "without dimming".

In the defect inspecting apparatus 1000 according to the present embodiment, luminance difference in accordance with difference in the distance from each illumination element in the capturing range can be reduced by performing such individual dimming in advance before inspection for all of the low-angle illumination elements 116, the intermediate-angle illumination elements 121, and the high-angle illumination elements 131.

Specific methods and requirements of the individual dimming are not particularly limited, but, for example, criteria are set for the lowest luminance or the luminance difference Δb2, and dimming is performed to satisfy the criteria.

Instead of dimming based on luminance distribution in a captured image, illuminance in the capturing range may be directly measured by predetermined measurement means, and individual dimming may be performed based on its distribution (illuminance distribution).

The movement mechanism 140 is provided to move the camera 110 and the support body 101 to which the low-angle illumination part 115, the intermediate-angle illumination part 120, and the high-angle illumination part 130 are attached. In the case that the capturing range of the camera 110 is smaller than the area of the end face 1a of the honeycomb structural body 1 due to the resolution of the camera 110 or the like, the movement mechanism 140 moves the camera 110 and the support body 101 to the next capturing place each time image capturing at a capturing place ends.

The defect inspecting apparatus 1000 may be configured such that the camera 110 and the support body 101 are fixedly provided and the table T moves.

The controller 200 is implemented by a computer such as a general-purpose personal computer. The controller 200 includes an input operation part 201 constituted by a mouse, a keyboard, and the like, through which inputting of an instruction for execution of defect inspection and condition setting is performed by a worker, and a display part 202 such as a display configured to perform menu display for defect inspection, display of inspection result, and the like.

In addition, the controller 200 includes, as functional components implemented through an execution of an operation program, stored in a storage part, not illustrated, such as a hard disk provided to the computer, by a control part, not illustrated, provided to the computer including a CPU, a ROM, and a RAM, an integrated control part 210 configured to collectively control operation of the entire defect inspecting apparatus 1000, an illumination control part 220 configured to control switching operation to turn on and off (ON/OFF) illumination at the low-angle illumination part 115, the intermediate illumination part 120, and the high-angle illumination part 130, an image processing part 230 configured to generate determination image data used for determination of existence of a defect based on captured image data generated by image capturing through the camera 110, and a defect determination part 240 configured to determine the existence of a defect based on the determination image data.

The integrated control part 210 controls the illumination control part 220 and the image capturing control part 111 provided to the image capturing execution part 100 in synchronization, in response to an execution instruction for inspection from the input operation part 201, in order to execute image capturing for defect inspection image data of the end face 1*a* being irradiated with illumination light.

Specifically, when a predetermined control signal is provided from the integrated control part 210 to the illumination control part 220, the illumination control part 220 sequentially turns on and off the m0 low-angle illumination elements 116 provided to the low-angle illumination part 115, the m1 intermediate-angle illumination elements 121 provided to the intermediate-angle illumination part 120, and the m2 high-angle illumination elements 131 provided to the high-angle illumination part 130 at a predetermined timing for a turn-on time in response to the signal.

On the other hand, from the integrated control part 210 to the image capturing control part 111, a control signal for subsequently performing image capturing through the camera 110 in synchronization with the sequential turning-on of the m0 low-angle illumination elements 116, the m1 intermediate-angle illumination elements 121, and the m2 high-angle illumination elements 131 is provided. The image capturing control part 111 controls the camera 110 to perform image capturing at a predetermined timing in response to the control signal.

The integrated control part 210 performs instruction for moving the image capturing execution part 100 to the next capturing place at the time when image capturing at a certain capturing place ends. In addition, the integrated control part 210 performs processing for displaying a determination result data generated by the defect determination part 240 on the display part 202.

The image processing part 230 acquires captured image data generated by image capturing through the camera 110, directly or indirectly (through the integrated control part 210) from the image capturing control part 111, performs predetermined processing, and finally generates determination image data. The image processing part 230 includes a luminance correction processing part 231, a maximum/minimum luminance image generation part 232, and a determination image generation part 233 as functional components for performing the generation of the determination image data based on the captured image data.

As described above, the low-angle illumination part 115 is provided with the m0 (for example, eight) low-angle illumination elements 116, and image capturing is subsequently performed each time the low-angle illumination elements 116 are sequentially turned on, so that m0 pieces of captured image data (low-angle illumination captured image data, simply referred to as a low-angle captured image data hereinafter) are obtained. The intermediate-angle illumination part 120 is provided with the m1 (for example, eight) intermediate-angle illumination elements 121, and image capturing is subsequently performed each time the intermediate-angle illumination elements 121 are sequentially turned on, so that m1 pieces of captured image data (intermediate-angle illumination captured image data, simply referred to as an intermediate-angle captured image data hereinafter) are obtained. In the similar manner, the high-angle illumination part 130 is provided with the m2 (for example, eight) high-angle illumination elements 131, and image capturing is subsequently performed each time the high-angle illumination elements 131 are sequentially turned on, so that m2 pieces of captured image data (high-angle illumination captured image data, simply referred to as a high-angle captured image data hereinafter) are obtained.

The m0 pieces of low-angle captured image data, m1 pieces of intermediate-angle captured image data, and the m2 pieces of high-angle captured image data are subjected to luminance correction performed by the luminance correction processing part 231 as preprocessing and used to maximum luminance image generation and minimum luminance image generation at the maximum/minimum luminance image generation part 232.

The luminance correction processing part 231 acquires captured image data generated by image capturing through the camera 110 (low-angle captured image data, intermediate-angle captured image data, high-angle captured image data), and performs luminance correction processing of correcting luminance distribution in the captured image data.

In general, the luminance correction processing at the luminance correction processing part 231 is processing performed to equalize the luminance level at the end face 1*a* of the honeycomb structural body 1 between the pieces of low-angle captured image data, between the pieces of intermediate-angle image data, and between the pieces of high-angle image data to prevent generation of failure attributable to the difference in distance from the illumination (light source) in subsequent processing. Schematically, in this processing, the opened first cell 3*a*, the joining part 2*b*, or a normal part at which no defect or the like exists at the end face 1*a* is set as a reference part (base part), and the luminance at the reference part is equalized between the pieces of captured image data.

FIGS. 11A to 11C are diagrams for description of the influence of difference in the distance from the illumination element to the irradiated position.

FIG. 11A illustrates a situation in which the end face 1*a* of the honeycomb structural body 1 is obliquely irradiated with two of illumination light Ln and illumination light Lf in directions symmetric to each other with respect to the normal direction (direction into the figure) of the end face 1*a*. The illumination light Ln is emitted from an illumination element close to a part in the vicinity of a certain arbitrary end (hereinafter simply referred to as an end part) fv1 in the view angle (capturing range) of the camera 110, and the illumination light Lf is emitted from an illumination element far from the end part fv1. Although FIG. 11A illustrates the two illumination light beams together for description, but the illumination light beams are not simultaneously emitted in reality. The joining part 2b is omitted in the end face 1a.

In addition, FIGS. 11B and 11C are cross-sectional views schematically illustrating situations when the vicinity of a defect (scoop) df6 included in the end part fv1 is irradiated with the illumination light Ln and the illumination light Lf, respectively.

At irradiation with the illumination light Ln, as illustrated in FIG. 11B, part of the end face 1a at which the defect df6 is not present and most of the defect df6 are an irradiated region RE11a of the illumination light Ln, whereas part of a slant face of the defect df6 is a shadow region RE12a. Similarly, at irradiation with the illumination light Lf, as illustrated in FIG. 11C, part of the end face 1a at which the defect df6 is not present and most of the defect df6 are an irradiated region RE11b of the illumination light Lf, whereas part of a slant face of the defect df6 is a shadow region RE12b.

If the illumination light Ln and the illumination light Lf have the same illuminance at the end part fv1, the luminance in the two irradiated regions RE11a and RE11b is the same between two pieces of captured image data obtained by image capturing through the camera 110 under irradiation with each illumination light, and the luminance in the two shadow regions RE12a and RE12b are the same therebetween.

However, when the illumination light Ln and the illumination light Lf at the end part fv1 have illuminance difference therebetween attributable to difference in the distance to the light source, the luminance is not the same between the irradiated regions RE11a and RE11b nor between the shadow regions RE12a and RE12b. In some cases, the luminance value of the shadow region RE12a formed by the illumination light Ln for which the distance to the light source is short is larger than the luminance value of the irradiated region RE11b formed by the illumination light Lf for which the distance to the light source is long. For example, the shadow regions RE12 are not reflected in the determination image in some cases. In such a case, it is difficult to accurately perform defect inspection. The luminance correction processing in the luminance correction processing part 231 is performed to prevent generation of such failure.

The luminance correction processing also has an effect of reducing luminance difference attributable to difference in the distance from the illumination light in the view angle, which still remains through the above-described individual dimming of each dimming unit.

In the defect inspecting apparatus 1000 according to the present embodiment, corrected image data (m0 pieces of low-angle corrected image data, m1 pieces of intermediate-angle corrected image data, and m2 pieces of high-angle corrected image data) generated based on each piece of captured image data through the luminance correction processing by the luminance correction processing part 231 is used to generation of maximum luminance image data (low-angle maximum luminance image data, intermediate-angle maximum luminance image data, high-angle maximum luminance image data) and minimum luminance image data (low-angle minimum luminance image data, intermediate-angle minimum luminance image data, high-angle minimum luminance image data) by the maximum/minimum luminance image generation part 232.

Details of the luminance correction processing by the luminance correction processing part 231 will be described later.

The maximum/minimum luminance image generation part 232 has a function of performing synthesis processing of generating one piece of low-angle maximum luminance image data and one piece of low-angle minimum luminance image data from m0 pieces of low-angle corrected image data, generating one piece of intermediate-angle maximum luminance image data and one piece of intermediate-angle minimum luminance image data from m1 pieces of intermediate-angle corrected image data, and generating one piece of high-angle maximum luminance image data and one piece of high-angle minimum luminance image data from m2 pieces of high-angle corrected image data.

The low-angle maximum luminance image data is image data in which $B_{1(x,y)}$ is given in an expression below when $B_{1(x,y)}$ represents the luminance value at a pixel (x, y) and $B_{1(x,y)i}$ represents the luminance value at an individual pixel (x, y) of the i-th low-angle corrected image data:

$$B_{1(x,y)} = \text{Max}\{B_{1(x,y)1}, B_{1(x,y)2}, \ldots B_{1(x,y)m0}\} \quad (1)$$

That is to say, the low-angle maximum luminance image data is synthesis image data in which m0 pieces of low-angle corrected image data is synthesized so that a maximum value Max$\{B_{1(x,y)1}, B_{1(x,y)2}, \ldots B_{1(x,y)m0}\}$ of the luminance value at each pixel (x, y) is the luminance value at the pixel (x, y).

Similarly, the intermediate-angle maximum luminance image data is image data in which $B_{2(x,y)}$ is given in an expression below when $B_{2(x,y)}$ represents the luminance value at a pixel (x, y) and $B_{2(x,y)i}$ represents the luminance value at an individual pixel (x, y) of the i-th intermediate-angle corrected image data:

$$B_{2(x,y)} = \text{Max}\{B_{2(x,y)1}, B_{2(x,y)2}, \ldots B_{2(x,y)m1}\} \quad (2)$$

Similarly, the high-angle maximum luminance image data is image data in which $B_{3(x,y)}$ is given in an expression below when $B_{3(x,y)}$ represents the luminance value at a pixel (x, y) and $B_{3(x,y)i}$ represents the luminance value at an individual pixel (x, y) of the i-th high-angle corrected image data:

$$B_{3(x,y)} = \text{Max}\{B_{3(x,y)1}, B_{3(x,y)2}, \ldots B_{3(x,y)m2}\} \quad (3)$$

In the meanwhile, the low-angle minimum luminance image data is image data in which $B_{4(x,y)}$ is given in an expression below when $B_{4(x,y)}$ represents the luminance value at a pixel (x, y) and $B_{4(x,y)i}$ represents the luminance value at an individual pixel (x, y) of the i-th low-angle corrected image data:

$$B_{4(x,y)} = \text{Min}\{B_{4(x,y)1}, B_{4(x,y)2}, \ldots B_{4(x,y)m0}\} \quad (4)$$

That is to say, the low-angle minimum luminance image data is synthesis image data in which m0 pieces of low-angle corrected image data is synthesized so that a minimum value Min $\{B_{4(x,y)1}, B_{4(x,y)2}, \ldots B_{4(x,y)m0}\}$ of the luminance value at each pixel (x, y) is the luminance value at the pixel (x, y).

Similarly, the intermediate-angle minimum luminance image data is image data in which $B_{5(x,y)}$ is given in an expression below when $B_{5(x,y)}$ represents the luminance value at a pixel (x, y) and $B_{5(x,y)i}$ represents the luminance value at an individual pixel (x, y) of the i-th intermediate-angle corrected image data:

$$B_{5(x,y)} = \text{Min}\{B_{5(x,y)1}, B_{5(x,y)2}, \ldots B_{5(x,y)m1}\} \quad (5)$$

Similarly, the high-angle minimum luminance image data is image data in which $B_{6(x,y)}$ is given in an expression below when $B_{6(x,y)}$ represents the luminance value at a pixel (x, y)

and $B_{6(x,y)i}$ represents the luminance value at an individual pixel (x, y) of the i-th high-angle corrected image data:

$$B_{6(x,y)} = \text{Min}\{B_{6(x,y)1}, B_{6(x,y)2}, \ldots B_{6(x,y)m2}\} \quad (6)$$

In this way, the maximum/minimum luminance image generation part 232 generates the six types of synthesis image data in total in which a combination of a scheme of illumination at image capturing and a scheme of dealing with the pixel value differs. In the defect inspecting apparatus 1000, the six types of synthesis image data generated by the maximum/minimum luminance image generation part 232 are used for generating the determination image data in the determination image generation part 233.

The determination image generation part 233 generates the low-angle determination image data, the intermediate-angle determination image data, and the high-angle determination image data used for determination processing in the defect determination part 240 based on those six types of synthesis image data. The determination image generation part 233 includes an opening specifying processing part 233a, a joining part specifying processing part 233b, an outer part specifying processing part 233c, and a filter processing part 233d.

Schematically, the low-angle (; intermediate-angle; high-angle) determination image data is generated by binarizing (gradation) image data obtained from the low-angle (; intermediate-angle; high-angle) minimum luminance image expressed by the low-angle (; intermediate-angle; high-angle) minimum luminance image data through exclusion of a pixel region corresponding to a part which needs not be inspected, by predetermined filter processing. In the present embodiment, a description of "A1 (; B1; C1) is A2 (; B2; C2)" and a description conforming to this are done for purpose of collectively describing B1 and B2 and C1 and C2 replacing A1 and A2, respectively, which originally need to be described in parallel in reality, in consideration of redundancy.

The part which needs not be inspected indicates the first cell 3a opening at the end face 1a, the joining part 2b which may be included in the image captured region depending on a position where the captured image is acquired (position of the image captured region), and/or a part outside the honeycomb structural body 1. It is clear that there is no ceramic to be inspected in the first cell 3a, the joining part 2b, and the part outside the honeycomb structural body 1, thus in the present embodiment, the pixel region corresponding to the first cell 3a, the joining part 2b, and the part outside the honeycomb structural body 1 is determined to be a region not inspected (excluded from inspection) from a viewpoint of inspection efficiency. Each pixel region (excluded pixel region) is specified by the opening specifying processing part 233a, the joining part specifying processing part 233b, and the outer part specifying processing part 233c. The opening specifying processing part 233a, the joining part specifying processing part 233b, and the outer part specifying processing part 233c are also collectively referred to as an excluded region specifying part. The exclusion of the excluded pixel region from the inspection target is achieved when the filter processing part 233d performs mask processing of making the pixel region act as a mask on the low-angle determination image data, the intermediate-angle determination image data, and the high-angle determination image data.

In a case of the six types of synthesis image data generated based on the captured image of the same image captured region, the positions of the first cell 3a (more specifically, the opening thereof), the joining part 2b, and the part outside the honeycomb structural body 1 in the images indicated by the six types of synthesis image data are the same as each other. Thus, once the pixel region corresponding thereto can be specified based on any of the six types of the synthesis image data, the same pixel region in the image indicated by the other five types of image data is also specified to correspond to the opening, the joining part 2b, and the part outside the honeycomb structural body 1.

The filter processing part 233d also has a function of performing various types of filter processing on the low-angle (; intermediate angle; high-angle) minimum luminance image data on which the mask processing of excluded pixel region is performed, and performing processing of generating the low-angle (; intermediate-angle; high-angle) determination image data which is data more appropriate for the determination of the existence of a defect. The filter processing includes the well-known image processing technologies of binarization processing, closing processing (expansion-contraction processing), and labeling processing.

Schematically, the filter processing part 233d performs the binarization processing to each of the low-angle minimum luminance image data, the intermediate-angle minimum luminance image data, and the high-angle minimum luminance image data in which the pixel located in a region other than the masked pixel region has a gradation value, based on a predetermined luminance threshold, and removes a minute dark pixel region as a noise component by subjecting a pixel region (region in which dark pixels are continuous) that has become a dark pixel of luminance 0 as a result of the binarization to the closing processing, and performs labeling on the remaining dark pixel region through the labeling processing, thereby generating the low-angle determination image data, the intermediate-angle determination image data, and the high-angle determination image data.

Details of processing in each part (the opening specifying processing part 233a, the joining part specifying processing part 233b, the outer part specifying processing part 233c, and the filter processing part 233d) of the determination image generation part 233 are described later.

The defect determination part 240 determines existence of a defect based on the low-angle determination image data, the intermediate-angle determination image data, and the high-angle determination image data. Schematically, when a dark pixel region exists with an area equal to or larger than a predetermined threshold in a determination image expressed by each of the low-angle determination image data, the intermediate-angle determination image data, and the high-angle determination image data, the defect determination part 240 determines that a defect exists at the existence position of the dark pixel region.

The low-angle determination image data and the intermediate-angle determination image data are mainly used for detecting a defect such as a chip or a scoop. In the meanwhile, the high-angle determination image data is mainly used for detecting a crack.

When the m0 pieces of low-angle captured image data, the m1 pieces of intermediate-angle captured image data, and the m2 pieces of high-angle captured image data include a shadow region (a region of low luminance value) corresponding to a defect, the low-angle determination image data, the intermediate-angle determination image data, and the high-angle determination image data express an image in which a shadow region in each piece of captured image data is virtually superimposed as conceptually illustrated as an example in FIGS. 5A to 5I. This means that a shadow region attributable to a defect is enhanced in the low-angle determination image data, the intermediate-angle determination image data, and the high-angle determination image data.

On the other hand, even when the low-angle captured image data, the intermediate-angle captured image data, or the high-angle captured image data obtained by performing image capturing under the low-angle illumination element, the intermediate-angle illumination element, or the high-angle illumination element emitting light in a certain direction includes a shadow region attributable to the normal surface irregularity ns existing on the ceramic surface 6, in the low-angle captured image data, the intermediate-angle image data, or the high-angle captured image data obtained by performing image capturing while irradiating the same place with light in different directions from the low-angle illumination element, the intermediate-angle illumination element, or the high-angle illumination element, chips, scoops, and cracks are enhanced as compared to the shadow region corresponding to the surface irregularity ns, because the area of the surface irregularity ns is relatively small. In the first place, the shadow region corresponding to the surface irregularity ns is unlikely to be formed under the high-angle illumination element at a large irradiation angle.

In the defect inspecting apparatus 1000, the certainty of detection of a defect at the end face 1a of the honeycomb structural body 1 is increased by using the low-angle determination image data, the intermediate-angle determination image data, and the high-angle determination image data having such characteristics in defect existence determination.

All of the low-angle determination image data, the intermediate-angle determination image data, and the high-angle determination image data derive from the minimum luminance image data, and in the defect determination part 240, the high-angle maximum luminance image data is also complimentarily used from a viewpoint of reducing an excess detection in detecting cracks.

Details of the determination processing by defect determination part 240 will be described later.

<Defect Inspection Processing>

Figure 12:
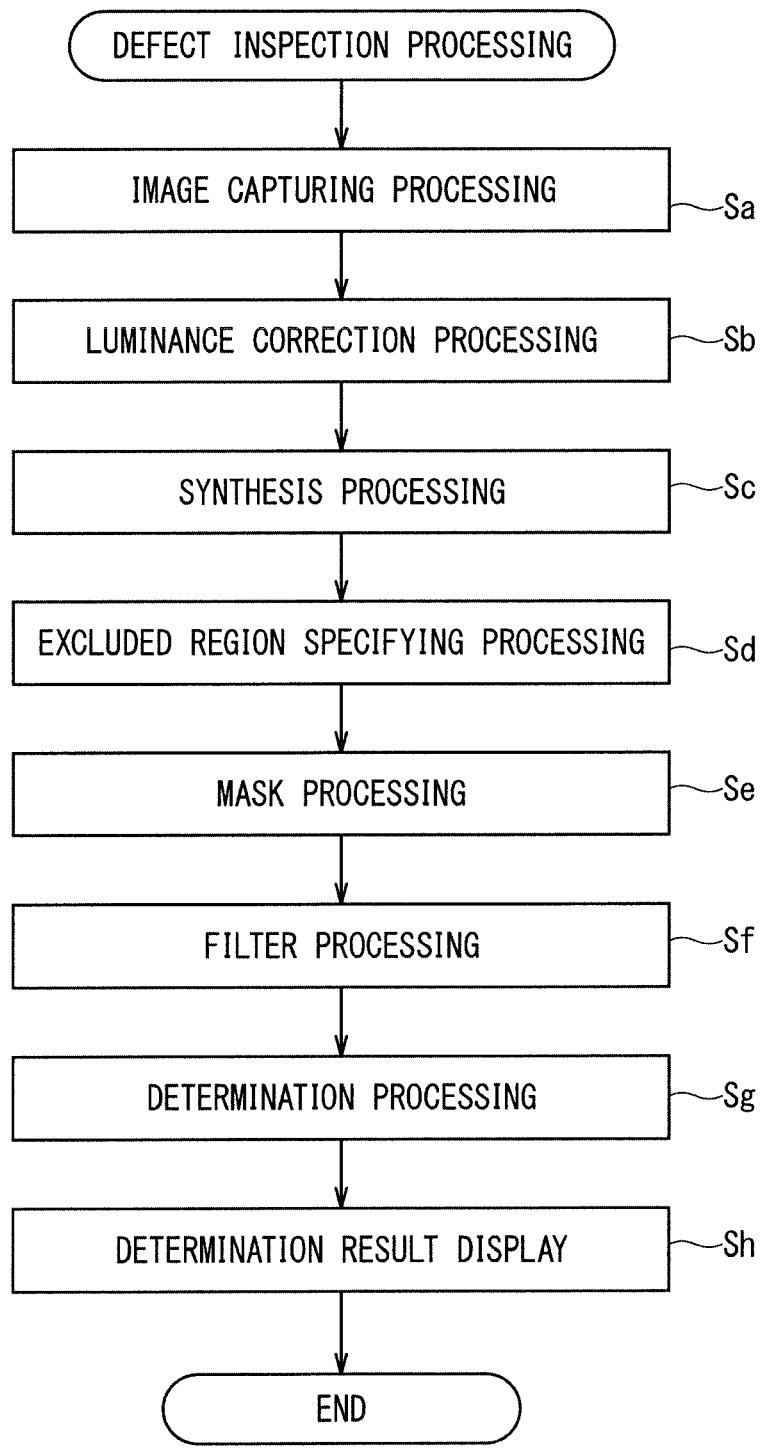
FIG. 12 is a diagram illustrating a schematic procedure of defect inspection processing performed in the defect inspecting apparatus 1000.

The following describes processing for defect inspection performed by the defect inspecting apparatus 1000 having the configuration described above. FIG. 12 is a diagram illustrating a schematic procedure of defect inspection processing performed in the defect inspecting apparatus 1000.

In the defect inspection processing in the defect inspecting apparatus 1000, image capturing processing (Step Sa) of capturing an image of the end face 1a of the honeycomb structural body 1 through the camera 110 is performed, in which individual illumination elements included in the low-angle illumination part 115, the intermediate illumination part 120, and the high-angle illumination part 130 are sequentially turning on and off and capturing is executed only when turned on. The m0 pieces of low-angle captured image data, the m1 pieces of intermediate-angle captured image data, and the m2 pieces of high-angle captured image data are generated by the image capturing processing.

Subsequently, the luminance correction processing part 231 performs luminance correction processing (Step Sb) of correcting a difference of luminance values due to distances from the illumination elements used for image capturing on the captured image data. The m0 pieces of low-angle corrected image data, the m1 pieces of intermediate-angle corrected image data, and the m2 pieces of high-angle corrected image data are generated by the luminance correction processing.

Subsequently, the maximum/minimum luminance image generation part 232 performs the synthesis processing synthesizing those pieces of corrected image data based on the expressions (1) to (6), thereby to generate the six pieces of synthesis image data (Step Sc). Specifically, each of the low-angle maximum luminance image data, the intermediate-angle maximum luminance image data, and the high-angle maximum luminance image data is generated based on each of the expression (1) to the expression (3), and each of the low-angle minimum luminance image data, the intermediate-angle minimum luminance image data, and the high-angle minimum luminance image data is generated based on each of the expression (4) to the expression (6).

After those pieces of synthesis image data are generated, the opening specifying processing part 233a, the joining part specifying processing part 233b, and the outer part specifying processing part 233c in the determination image generation part 233 perform excluded region specifying processing of specifying an excluded pixel region in the image expressed by each piece of synthesis image data (Step Sd). Subsequently, the filter processing part 233d performs the mask processing using the excluded pixel region (Step Se) and further performs the filter processing (Step Sf), thereby generating the low-angle determination image data, the intermediate-angle determination image data, and the high-angle determination image data.

Then, the determination processing (Step Sg) is performed by the defect determination part 240 based on those pieces of determination image data. A result of the determination processing is displayed on the display part 202 (Step Sh).

[Image Capturing Processing]

Figure 13:
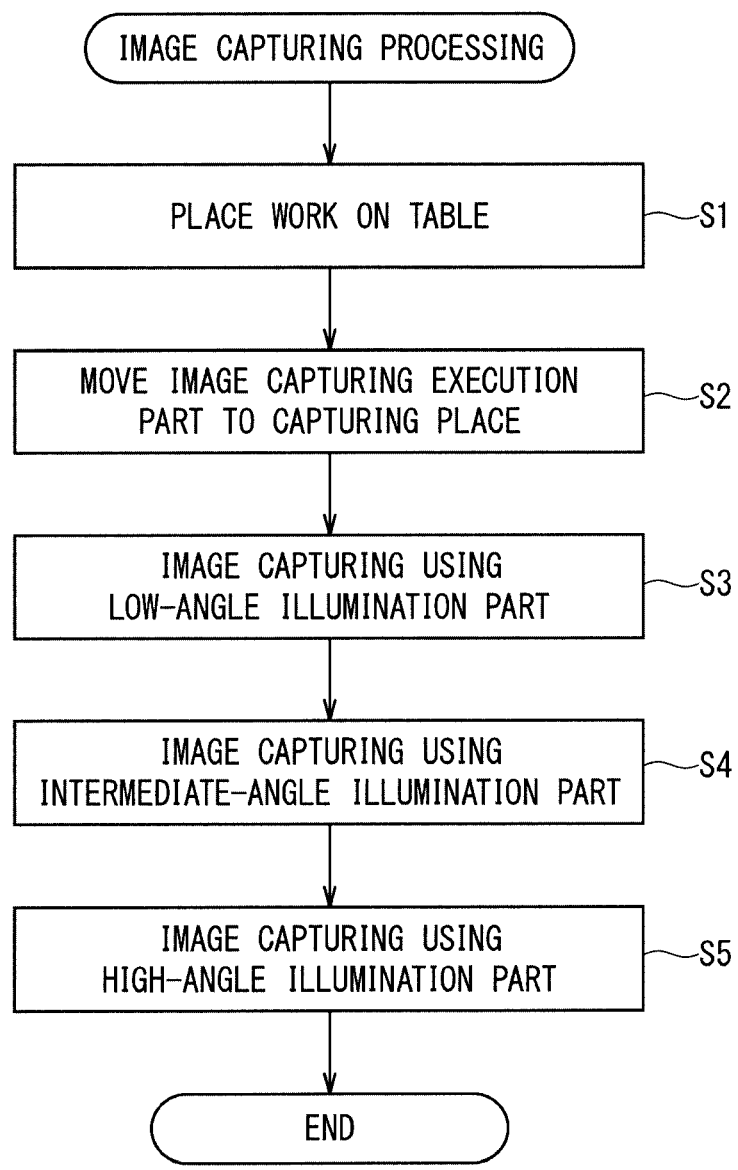
FIG. 13 is a diagram illustrating the procedure of image capturing processing performed by the defect inspecting apparatus 1000 for defect inspection.

FIG. 13 is a diagram illustrating the procedure of image capturing processing performed for defect inspection in the defect inspecting apparatus 1000. In FIG. 13 and description related to the figure, the honeycomb structural body 1 as a defect inspection target is also referred to as a "work", and the end face 1a as an inspection target surface of the honeycomb structural body 1 is also referred to as a "work end face".

First, the work is placed on the table T in a posture in which the end face thereof is an upper surface by a worker or predetermined conveyance means (placement means) (Step S1). After the work placement, when an execution instruction of a defect inspection is provided through the input operation part 201, the movement mechanism 140 is driven to move the image capturing execution part 100 (more specifically, the camera 110 and the support body 101 supporting the low-angle illumination part 115, the intermediate-angle illumination part 120, and the high-angle illumination part 130) to a capturing place (Step S2). When the capturing range of the camera 110 is smaller than the area of the work end face 1a, inspection is performed a plurality of times, and thus the capturing place in one inspection processing is a predetermined part of the end face 1a.

In this case, the work may be positioned when placing on the table T, or the posture of the camera 110 may be adjusted in the horizontal plane, so that the cells 3 of the work (the first cells 3a in appearance) are arrayed in the longitudinal and transverse axial directions in the capturing range of the camera 110, which is defined in a rectangular shape. However, even when the array direction of the cells 3 is slightly tilted relative to the longitudinal and transverse axial directions in the capturing range of the camera 110, the determination processing can be performed with no problem by performing correction with the tilt taken into account as necessary at the determination processing.

A sensor configured to sense that the work is placed on the table T may be provided, and the integrated control part 210 may emit, in response to a sensing signal from the sensor, a predetermined control signal for sequentially executing the image capturing processing and the following determination processing to each component of the defect inspecting apparatus 1000.

After the state where the image capturing execution part 100 is disposed at the capturing place is achieved, image capturing using the low-angle illumination part 115 (step S3), image capturing using the intermediate-angle illumination part 120 (step S4), and image capturing using the high-angle illumination part (step S5) are sequentially performed. As described above, such image capturing is performed after individual dimming of each illumination element is performed in advance to reduce luminance difference in the capturing range.

Figure 14:
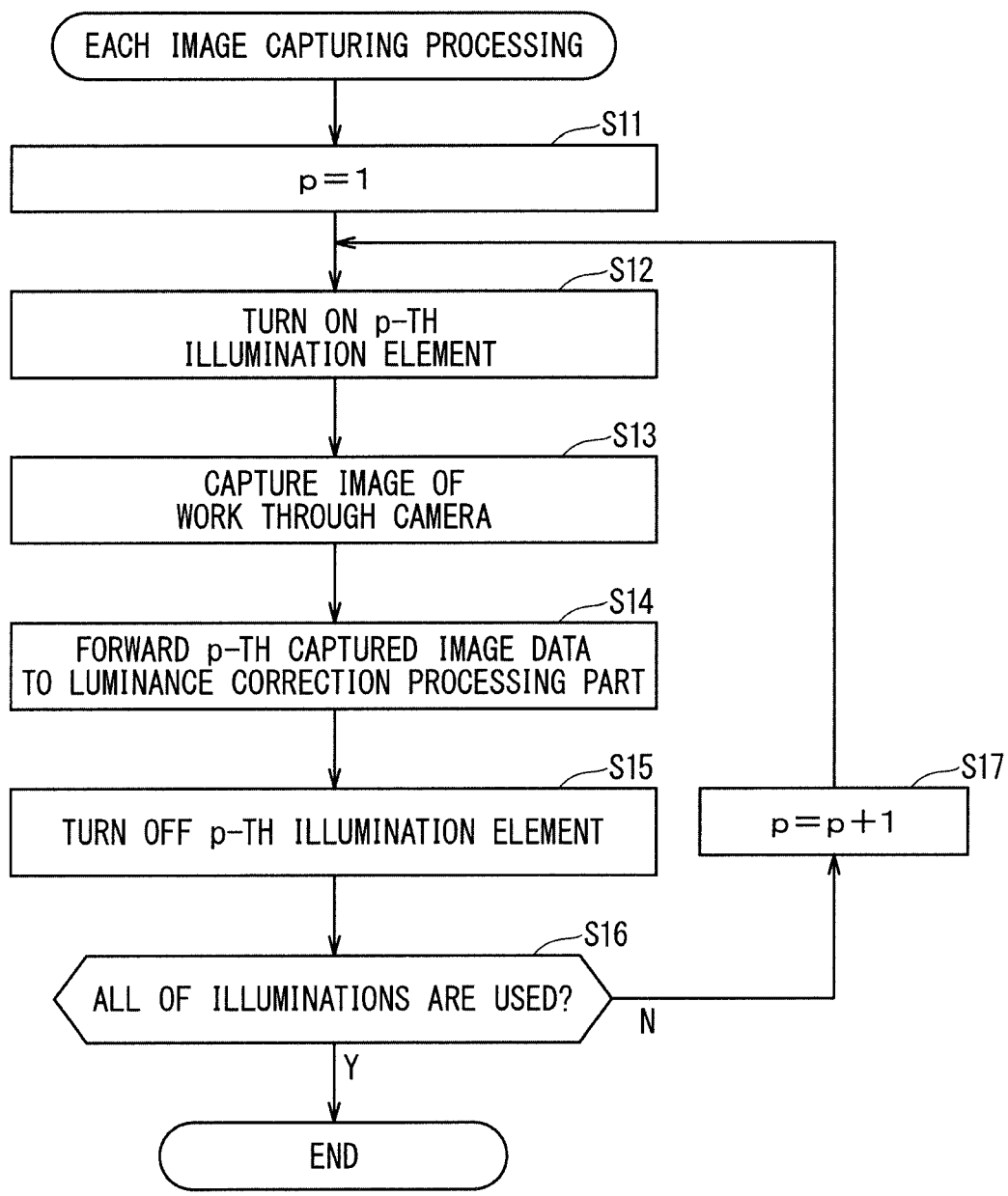
FIG. 14 is a diagram illustrating a specific procedure of image capturing processing.

FIG. 14 is a diagram illustrating a specific procedure of each kind of image capturing processing. In each kind of image capturing processing, the initial value of p=1 is set (Step S11), and sequential image capturing through the camera 110 is performed while all the illumination elements are sequentially turned on.

Specifically, the p-th illumination element (the low-angle illumination element 116, the intermediate-angle illumination element 121, or the high-angle illumination element 131) belonging to each illumination part (the low-angle illumination part 115, the intermediate-angle illumination part 120, or the high-angle illumination part 130) is turned on (Step S12), and the camera 110 captures an image of the work in such a turn-on state (Step S13). The p-th captured image data (low-angle captured image data, intermediate-angle captured image data, or high-angle captured image data) obtained through the image capturing is forwarded from the image capturing control part 111 to the luminance correction processing part 231 (Step S14), and used for generating the determination image data described later. Upon completion of the image capturing and the forwarding, the p-th illumination element (the low-angle illumination element 116, the intermediate-angle illumination element 121, or the high-angle illumination element 131) being turned on is turned off (Step S15). Alternatively, the p-th illumination element may be turned off immediately after the completion of the image capturing. Alternatively, all pieces of captured image data (low-angle captured image data, intermediate-angle captured image data, or high-angle captured image data) may be forwarded to the maximum/minimum luminance image generation part 232 when all the illumination elements of each illumination part are used for image capturing and the last image capturing is completed.

When not all the illumination elements are used (NO at Step S16), in other words, when there is any illumination element yet to be turned on, p=p+1 is set (Step S17), and Step S12 and the following processing are repeated.

When all the illumination elements are used (YES at Step S16), the image capturing processing using the illumination part ends.

[Luminance Correction Processing]

Figure 15:
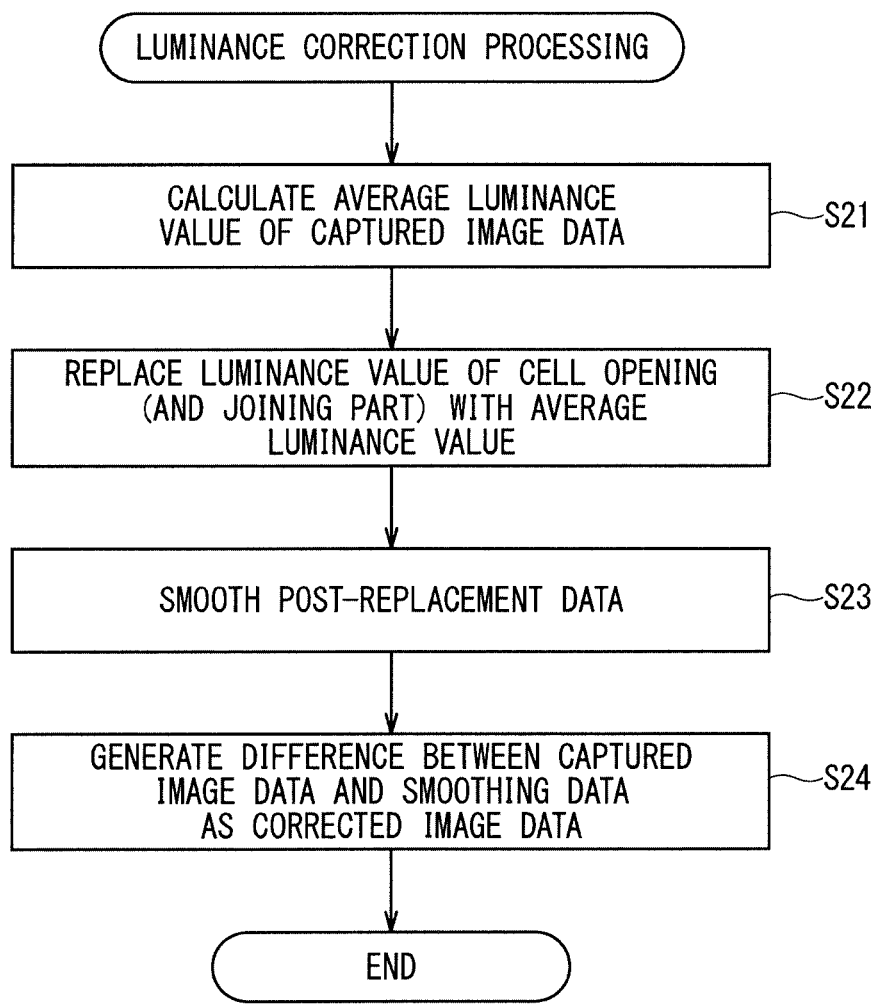
FIG. 15 is a diagram illustrating a schematic procedure of luminance correction processing performed by a luminance correction processing part 231 in defect inspection using the defect inspecting apparatus 1000.

FIG. 15 is a diagram illustrating a schematic procedure of luminance correction processing (low-angle correction processing, intermediate-angle correction processing, and high-angle correction processing) performed by the luminance correction processing part 231 in defect inspection using the defect inspecting apparatus 1000. FIGS. 16A to 16D are diagrams exemplarily illustrating the processing content of the luminance correction processing.

Figure 16A:
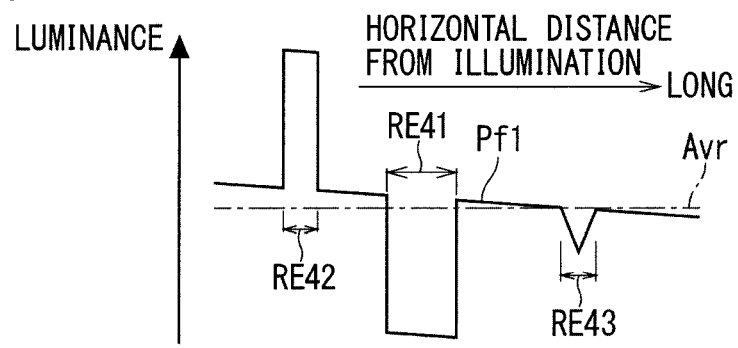
FIGS. 16A to 16D are diagrams exemplarily illustrating the processing content of luminance correction processing.

Herein, it is assumed that captured image data (low-angle captured image data, intermediate-angle captured image data, or high-angle captured image data) has a luminance distribution pf1 as illustrated in FIG. 16A. Specifically, a pixel region RE41 having a luminance value significantly smaller than that in its surroundings represents an image of the first cell 3a as an opening, a pixel region RE42 having a luminance value significantly larger than that in its surroundings represents an image of the joining part 2b, and a pixel region RE43 having a luminance value slightly smaller than that in its surroundings represents an image of a defect (typically, a scoop) formed at the end face 1a. Hereinafter, a part other than these pixel regions RE41, RE42, and RE43 is referred to as a base part. The negative slope of the luminance distribution pf1 in the figure as a whole, including the base part, indicates luminance difference remaining even through individual dimming. The joining part 2b may not exist depending on the configuration of the honeycomb structural body 1 as an inspection target.

In the luminance correction processing, first, an average value (average luminance value) Avr of the luminance value at each pixel is calculated for captured image data that provides such luminance distribution pf1 (Step S21). In FIG. 16A, the average luminance value Avr is illustrated with a dashed line.

Figure 16B:
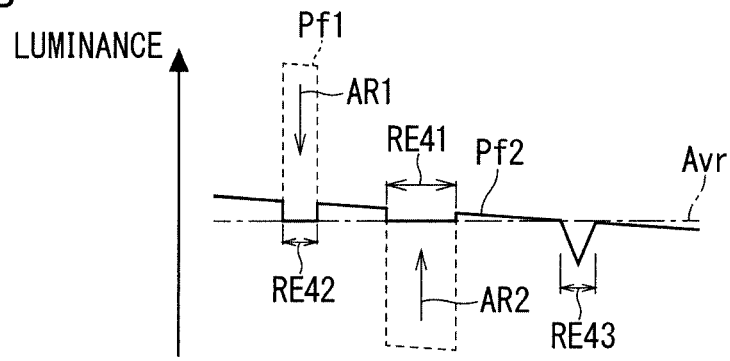

After the average luminance value Avr is obtained, the luminance value of the first cell 3a such as the pixel region RE41 and the luminance value of the joining part 2b such as the pixel region RE42 when it exists are replaced with the average luminance value Avr (Step S22). FIG. 16B illustrates luminance distribution pf2 of image data (post-replacement data) after the replacement, and also illustrates the luminance distribution pf1 with a dashed line. The arrangement positions and sizes of the first cell 3a and the joining part 2b in design are known, and thus the positions and ranges of pixels of their images can be roughly specified and the replacement can be easily performed. Alternatively, the similar effect can also be obtained by performing such a replacement on the pixel having the luminance value in which a difference value with the average luminance value Avr is larger than a predetermined value.

Figure 16C:
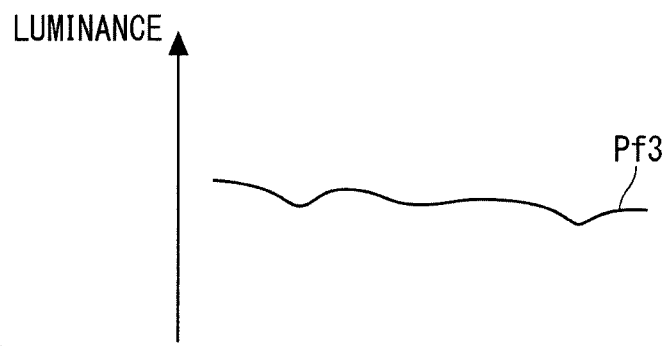

Subsequently after the replacement is performed, smoothing processing is performed on the post-replacement data to generate smoothing data (Step S23). A well-known method is applicable to the smoothing processing. FIG. 16C illustrates a luminance distribution pf3 of the obtained smoothing data.

The luminance distribution pf3 provided by the smoothing data has a negative slope in the figure like the luminance distribution pf1 provided by captured image data subjected to the luminance correction processing. In other words, the luminance distribution pf3 provided by the smoothing data obtained by temporarily generating the post-replacement data and smoothing the post-replacement data indicates rough distribution tendency of the luminance of the other part except for parts such as the first cell 3a and the joining part 2b, which are known singular points in the original luminance distribution pf1.

The luminance value in the smoothing data derived from captured image data for which the distance from an illumination element used for image capturing is short tends to be, as a whole, larger than the luminance value in the smoothing data derived from captured image data for which the distance from the illumination element is long.

Figure 16D:
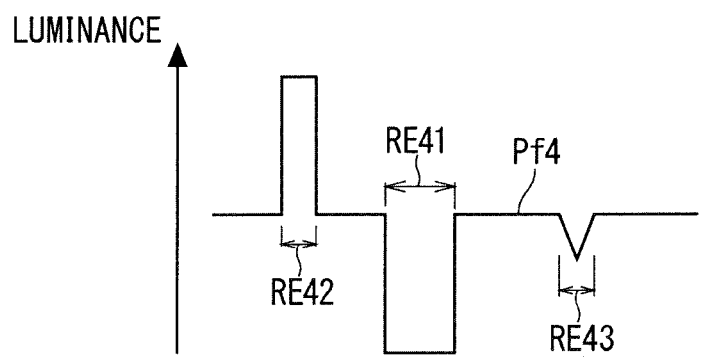

After the smoothing data is obtained, the difference between the original captured image data that provides the luminance distribution pf1 and the smoothing data is generated as corrected image data (Step S24). FIG. 16D illustrates a luminance distribution pf4 of the obtained corrected image data. More specifically, the corrected image data is obtained by calculating difference in the luminance value at an identical pixel position between the captured image data and the smoothing data for all pixel positions.

As illustrated in FIG. 16D, similarly to the original captured image data illustrated in FIG. 16A, the luminance distribution pf4 represented by the corrected image data includes the pixel region RE41 corresponding to the first cell 3a, the pixel region RE42 corresponding to the joining part 2b, and the pixel region RE43 corresponding to a defect (typically, a scoop) formed at the end face 1a. The luminance value at the base part other than these pixel regions is substantially constant. This is the effect of subtracting, from the original captured image data, the luminance value of the smoothing data, which tends to have a negative slope in the figure like the original captured image data.

Since the luminance value of the base part is substantially constant in this manner, the difference in the luminance value attributable to the distance from the illumination element used for image capturing is eliminated from the corrected image data.

In addition, since the smoothing data of the luminance value in accordance with the distance from the illumination element is subtracted from the original captured image data, the luminance of the base part, which is a normal (without a defect) part of the end face 1a, and is irradiated by all the illumination elements in the same manner in each of the low-angle illumination part 115, the intermediate-angle illumination part 120, and the high-angle illumination part 130, can be regarded as the same level (substantially identical) between the pieces of low-angle corrected image data, between the pieces of intermediate-angle corrected image data, and between the pieces of high-angle corrected image data. Accordingly, the luminance value difference due to the difference between the distances from mutually different illumination elements is also eliminated.

[Synthesis Processing]

The m0 pieces of low-angle corrected image data, the m1 pieces of intermediate-angle corrected image data, and the m2 pieces of high-angle corrected image data generated by the luminance correction processing part 231 are given to the maximum/minimum luminance image generation part 232. The maximum/minimum luminance image generation part 232 generates the six types of synthesis image data in total based on the expression (1) to the expression (6). Specifically, the low-angle (; intermediate-angle; high-angle) maximum luminance image data and the low-angle (; intermediate-angle; high-angle) minimum luminance image data are generated from the m0 pieces of low-angle corrected image data (; the m1 pieces of intermediate-angle corrected image data; the m2 pieces of high-angle corrected image data).

[Excluded Region Specifying Processing and Mask Processing]

The six types of synthesis image data generated by the maximum/minimum luminance image generation part 232 is given to the determination image generation part 233. Performed in the determination image generation part 233 are processing of specifying the excluded pixel region by each of the opening specifying processing part 233a, the joining part specifying processing part 233b, and the outer part specifying processing part 233c and the mask processing by the filter processing part 233d using the excluded region.

Figure 17A:
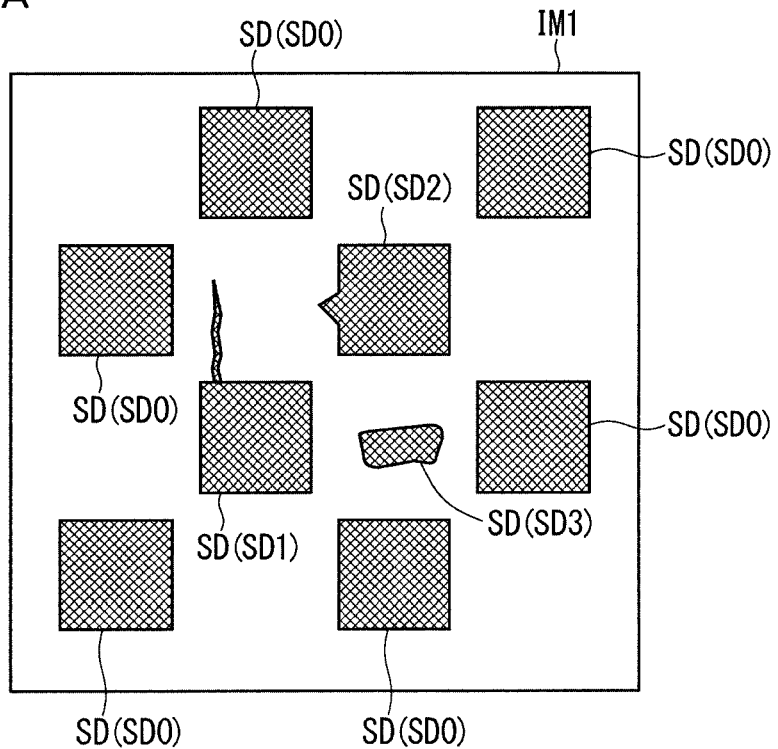
FIGS. 17A and 17B are diagrams for description of mask processing in a case where a first cell 3a opening in the end face 1a of the honeycomb structural body 1 is excluded from inspection as an example.
Figure 17B:
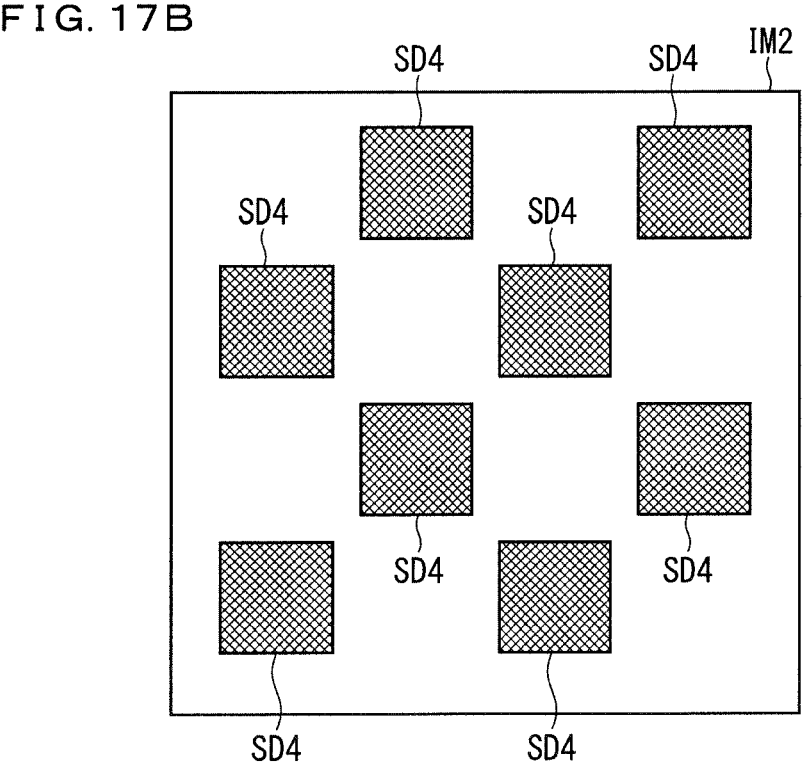
Figure 18:
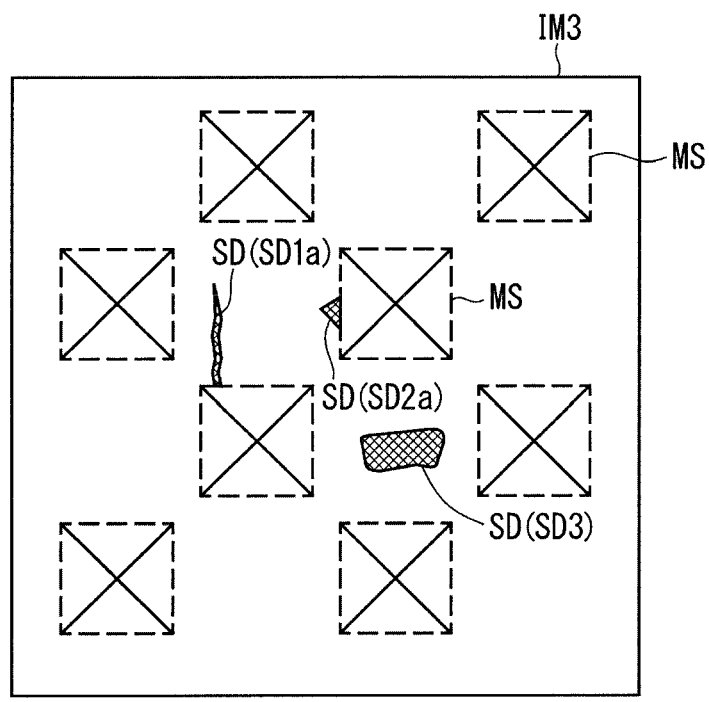
FIG. 18 is a diagram for description of mask processing in a case where a first cell 3a opening in the end face 1a of the honeycomb structural body 1 is excluded from inspection as an example.

FIG. 17A, FIG. 17B, and FIG. 18 are diagrams for description of mask processing in a case where the first cell 3a opening in the end face 1a of the honeycomb structural body 1 is excluded from inspection as an example. FIG. 17A exemplarily illustrates an image IM1 expressed by certain low-angle minimum luminance image data. The image IM1 illustrated in FIG. 17A corresponds to the ceramic surface 6 exemplarily illustrated in FIG. 4. In FIG. 17A, FIG. 17B, and FIG. 18, a part visually recognized as a dark part SD is cross-hatched.

Six dark parts SD0 having a square shape among the dark parts SD located in the image IM1 illustrated in FIG. 17A correspond to the first cell 3a. In the meanwhile, in dark parts SD1 and SD2, a dark portion corresponding to the crack df1 and the chip df2 exemplarily illustrated in FIG. 4 continues from the dark portion having the square shape, and a dark part SD3 corresponds to the scoop df3. In FIG. 17A, for convenience of illustration, a part other than the dark part SD is visually recognized to have a uniform brightness, however, there may be a slight shade of brightness in the part other than the dark part SD due to minute irregularities in the ceramic surface 6 in reality, for example.

In the meanwhile, FIG. 17B exemplarily illustrates an image IM2 based on the other image obtained by capturing of the same ceramic surface 6 at a timing before or after capturing an image, which is an original image of the image IM1. For simplification of description, in the image IM2, differing from the image IM1 illustrated in FIG. 17A, it is supposed that only a dark part SD4 with a square shape corresponding to the opening of the first cell 3a is visually recognized. Such an image IM2 can be generally obtained from the high-angle maximum luminance image data or the intermediate-angle maximum luminance image data, for example.

In a case where a position of the dark part SD4 is substantially the same as a position of the dark part SD0 and a part of the dark parts SD1 and SD2 having the square shape in the image IM1 illustrated in FIG. 17A, once the image data providing the image IM2 is obtained, by specifying a range of a pixel (pixel region) providing the dark part SD4 in accordance with contents of the data and disabling pixel information of the pixel region in the low-angle minimum luminance image data proving the image IM1 illustrated in FIG. 17A, the image indicated by the image data after the disablement visualizes a situation in which a dark part having a square shape in the image IM1 is masked.

FIG. 18 exemplarily illustrates an image IM3 expressed by the low-angle minimum luminance image data on which such a disablement has been performed. In the image IM3, a region corresponding to the pixel region in which the dark part having the square shape is located in the image IM1 is indicated as a mask MS. The mask MS is located in the part corresponding to the opening of the first cell 3a, thus only a dark part SD1a corresponding to the crack df1, a dark part SD2a corresponding to the chip df2, and a dark part SD3 corresponding to the scoop df3 remains as the dark part SD also in the image IM3. When the determination image data is generated based on the low-angle minimum luminance image data providing such an image IM3, the pixel region corresponding to the opening of the first cell 3a is excluded from the defect inspection target in advance.

Considered as a technique of achieving the disablement is a method that a description corresponding to pixel information of a target pixel region is deleted from minimum luminance image data in reality or a method that information is described in minimum luminance image data to ignore the pixel information of the pixel region at a time of generation of subsequent determination image data and defect determination, for example.

The mask processing on the joining part 2b and the part outside the honeycomb structural body 1 is also achieved by specifying a pixel region providing the joining part 2b and the part outside the honeycomb structural body 1 and disabling description contents relating to the pixel region in the minimum luminance image data used for generating the determination image in the manner similar to the case of the opening described above.

Needless to say, the excluded pixel region corresponding to the first cell 3a, the joining part 2b, and the part outside the honeycomb structural body 1 needs to be specified with a high degree of accuracy to excellently perform such mask processing. In the defect inspecting apparatus 1000 according to the present embodiment, the specification of the excluded pixel region by each of the opening specifying processing part 233a, the joining part specifying processing part 233b, and the outer part specifying processing part 233c is performed, taking account of the above point. More specifically, the synthesis image data corresponding to the type of the target excluded pixel region in the six types of synthesis image data generated in the maximum/minimum luminance image generation part 232 is used in each part of the opening specifying processing part 233a, the joining part specifying processing part 233b, and the outer part specifying processing part 233c.

The opening specifying processing part 233a specifies the pixel region corresponding to the first cell 3a (more specifically, the opening thereof) as the excluded pixel region based on the low-angle maximum luminance image data. Alternatively, a way of using the intermediate-angle maximum luminance image data is also applicable. Exemplarily illustrated as a specific scheme of specification is a way of specifying a pixel region in which a luminance value is equal to or smaller than a predetermined threshold in the low-angle maximum luminance image data.

Figure 19A:
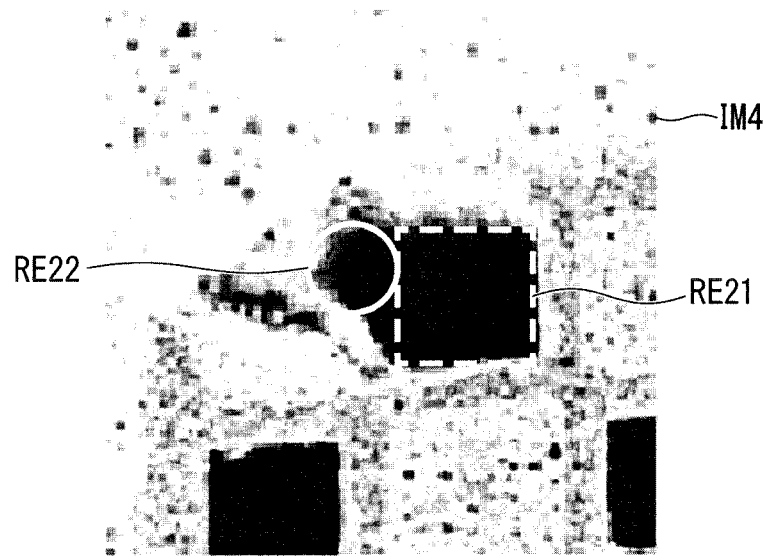
FIGS. 19A and 19B are diagrams exemplarily illustrating enlarged images of a part including an opening of the first cell 3a of images each indicated by synthetic image data in which a scheme of application of a luminance value differs.
Figure 19B:
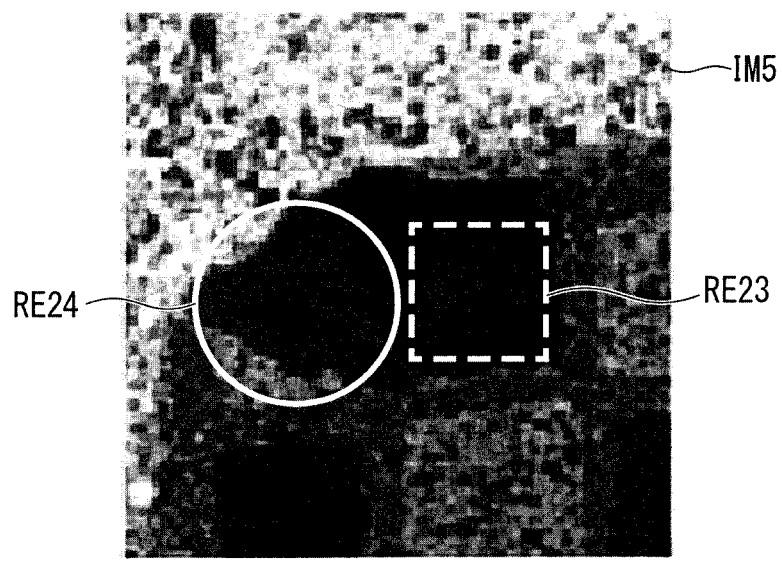

FIGS. 19A and 19B are diagrams exemplarily illustrating enlarged images of a part including the opening of the first cell 3a of images each indicated by synthetic image data in which a scheme of application of a luminance value differs. FIG. 19A illustrates an image IM4 according to the low-angle maximum luminance image data, and FIG. 19B illustrates an image IM5 according to the low-angle minimum luminance image data.

When the images are compared, a square region RE21 clearly defined except for a left end portion can be firstly found as illustrated with a dashed line in the image IM4 illustrated in FIG. 19A. A dark part region RE22 slightly continues in the left end portion. The dark part region RE22 is caused by a chip, which is a type of defect, in the opening of the first cell 3a. In the meanwhile, in the image IM5 illustrated in FIG. 19B, a surrounding of a square region RE23 illustrated in the same position as the square region RE21 also constitutes a continuous dark part, and particularly on a left side, a large dark part region RE24 expands to continue from the square region RE23 due to the presence of defect.

FIGS. 19A and 19B suggest that the opening might be recognized wider than reality when the minimum luminance image data is used. Particularly, in a case where there is a defect in the opening of the first cell 3a as is a case in the image IM5 illustrated in FIG. 19B, if the pixel region including the first cell 3a is specified using the minimum luminance image data, there is a possibility that not only the actual first cell 3a but also a defect part continuing from the first cell 3a is erroneously recognized as the opening, and the defect part is excluded in the determination image, thus is not preferable.

Figure 20A:
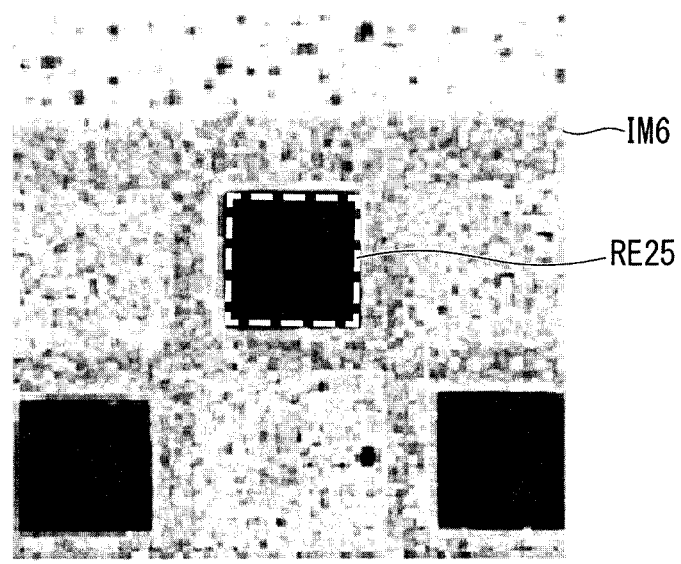
FIGS. 20A and 20B are diagrams exemplarily illustrating enlarged images of a part including the first cell 3a of images each indicated by synthetic image data in which a scheme of illumination differs.
Figure 20B:
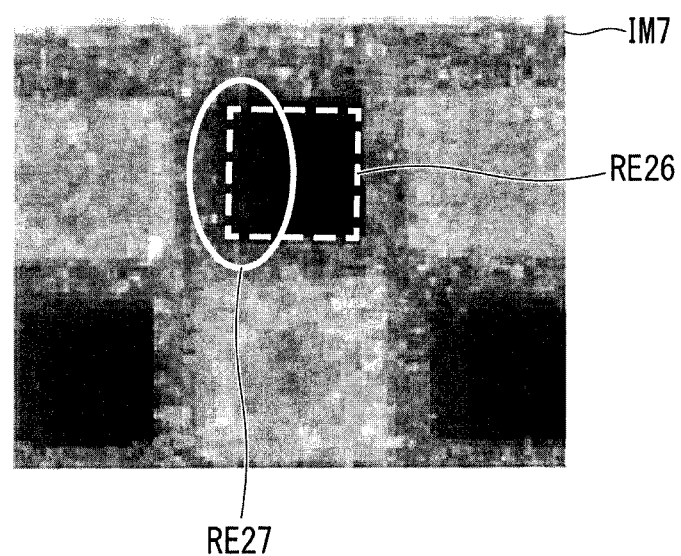

In the meanwhile, FIGS. 20A and 20B are diagrams exemplarily illustrating enlarged images of a part including the first cell 3a of images each indicated by synthetic image data in which a scheme of illumination differs. A position of the target first cell 3a differs from that in a case in FIGS. 19A and 19B. FIG. 20A illustrates an image IM6 according to the low-angle maximum luminance image data in the manner similar to the case in FIG. 19A, and FIG. 20B illustrates an image IM7 according to the high-angle maximum luminance image data.

When the images are compared, a square region RE25 clearly defined can be found as illustrated with a dashed line in the image IM6 illustrated in FIG. 20A, however, confirmed in the image IM7 illustrated in FIG. 20B is an image corresponding to a wall surface inside the first cell 3a in a left side part of a square region RE26 illustrated by an oval in the same position as the square region RE25.

FIGS. 20A and 20B suggest a possibility that a range narrower than the actual first cell 3a is erroneously recognized as the opening when the high-angle maximum luminance image data is used, by reason that a range of a region RE27 has a luminance value larger than the opening.

On the basis of the images illustrated in FIG. 19A, FIG. 19B, FIG. 20A and FIG. 20B, the specification of the first cell 3a in the opening specifying processing part 233a is performed based on the low-angle maximum luminance image data. Accordingly, the pixel region of the opening in the first cell 3a can be specified with a high degree of accuracy.

With regard to FIGS. 19A and 19B, the dark part region RE22 reflecting the defect may also be specified as the opening even when the low-angle maximum luminance image data is used. However, even if the dark part region RE22 is specified as the opening and masked, there is the synthesis image data including the information of the larger dark part such as the dark part region RE22 in the image IM5 according to the low-angle minimum luminance image data illustrated in FIG. 19B, and the defect is detected in accordance with the determination image based on such synthesis image data.

The joining part specifying processing part 233b specifies the pixel region corresponding to the joining part 2b as the excluded pixel region based on the intermediate-angle maximum luminance image data or the high-angle maximum luminance image data. Exemplarily illustrated as a specific scheme of specification is a way of specifying a pixel region in which a luminance value is equal to or larger than a predetermined threshold in the intermediate-angle maximum luminance image data or the high-angle maximum luminance image data.

Figure 21A:
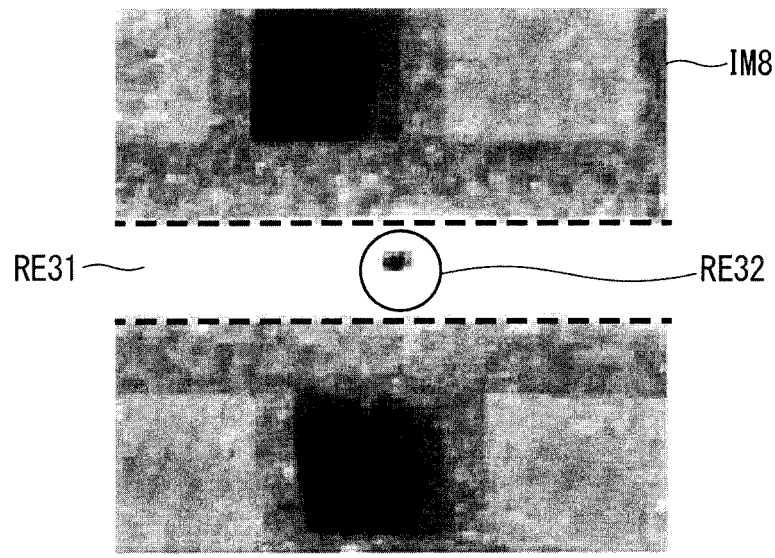
FIGS. 21A and 21B are diagrams exemplarily illustrating enlarged images of a part including a joining part 2b of images each indicated by synthetic image data in which a scheme of application of a luminance value differs.
Figure 21B:
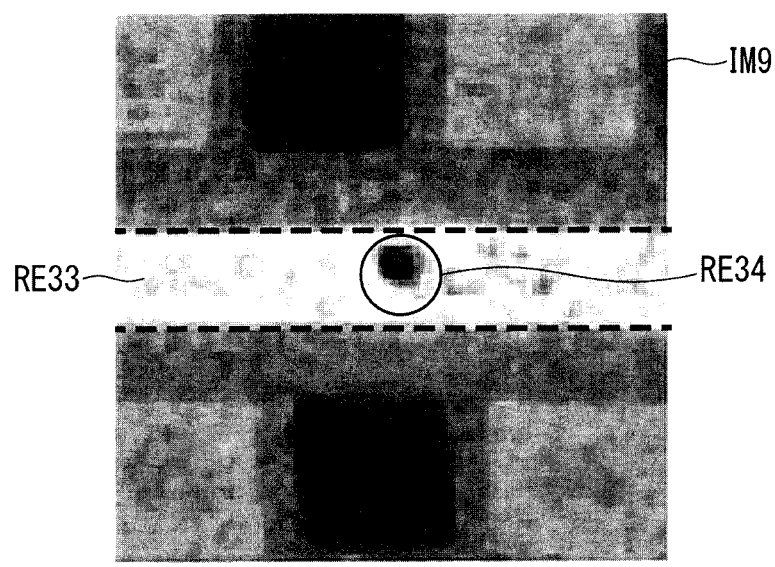

FIGS. 21A and 21B are diagrams exemplarily illustrating enlarged images of a part including the joining part 2b of images each indicated by synthetic image data in which a scheme of application of a luminance value differs. FIG. 21A illustrates an image IM8 according to the high-angle maximum luminance image data, and FIG. 21B illustrates an image IM9 according to the high-angle minimum luminance image data.

When the images are compared, firstly, a region RE31 and a region RE33 sandwiched between dashed lines correspond to the joining part 2b in the image IM8 illustrated in FIG. 21A and the image IM9 illustrated in FIG. 21B, respectively. These regions RE31 and RE33 have substantially the same width, thus the joining part 2b seems apparently to be excellently specified even when any image data is used. However, the region RE31 of the image IM8 has substantially a uniform luminance, but in contrast, a minute shade of brightness due to the irregularities in the joining part 2b is confirmed in the region RE33 of the image IM9.

In addition, as indicated by the regions RE32 and RE34, a dark part which is considered to correspond to a concave portion is included in the joining part 2b, and the latter has a larger area of the dark part. This suggests that when the joining part 2b is specified using the high-angle minimum luminance image data, there is a high possibility that a shape of the joining part 2b is erroneously recognized compared with a case of using the high-angle maximum luminance image data.

Figure 22A:
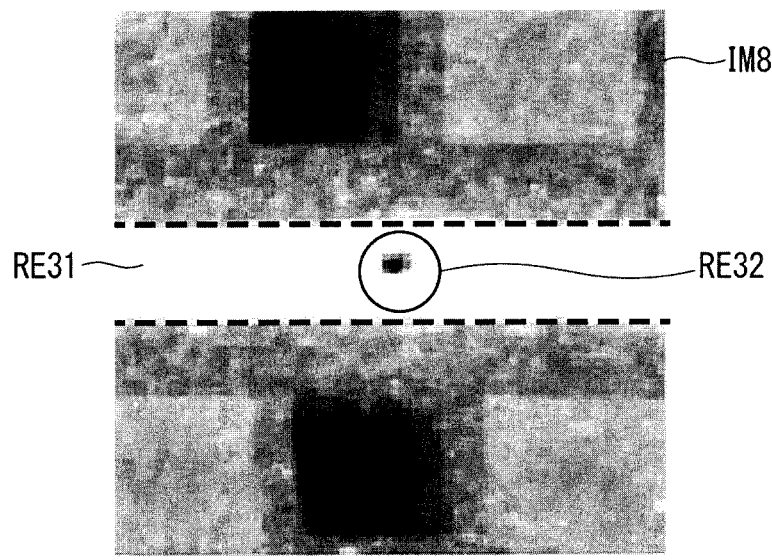
FIGS. 22A and 22B are diagrams exemplarily illustrating enlarged images of a part including the joining part 2b of images each indicated by synthetic image data in which a scheme of illumination differs.
Figure 22B:
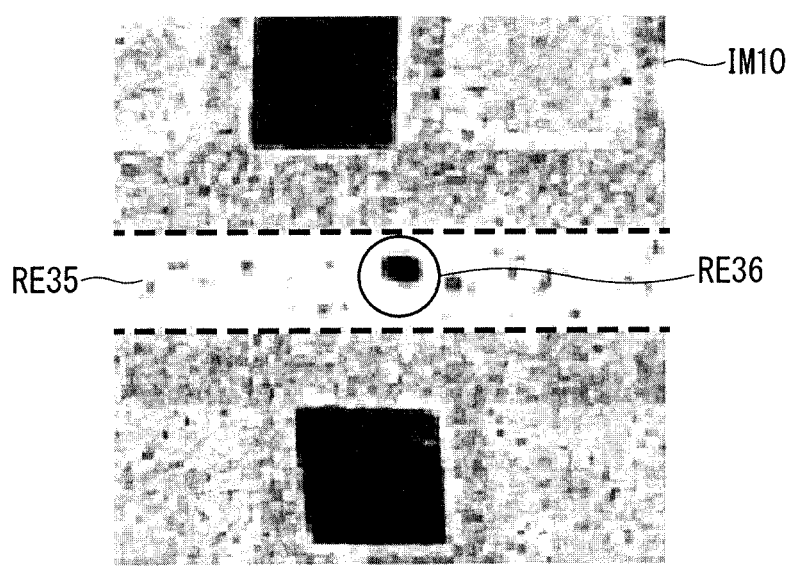

In the meanwhile, FIGS. 22A and 22B are diagrams exemplarily illustrating enlarged images of a part including the joining part 2b of images each indicated by synthetic image data in which a scheme of illumination differs. FIG. 22A illustrates an image IM8 according to the high-angle maximum luminance image data in the manner similar to the case in FIG. 21A, and FIG. 22B illustrates an image IM10 according to the low-angle maximum luminance image data.

When the images are compared, the region RE31 and a region RE35 sandwiched between dashed lines correspond to the joining part 2b in the image IM8 illustrated in FIG. 22A and the image IM10 illustrated in FIG. 22B, respectively, in the manner similar to the case in FIGS. 21A and 21B. Also in this case, the joining part 2b seems apparently to be excellently specified even when any image data is used. However, the region RE31 of the image IM8 has substantially a uniform luminance, but in contrast, a minute shade of brightness due to the irregularities in the joining part 2b is confirmed in the region RE35 of the image IM10.

In addition, when the dark parts each considered to correspond to the concave portion in the joining part 2b and illustrated as the regions RE32 and RE36 are compared, latter has a larger area. This suggests that when the joining part 2b is specified using the low-angle maximum luminance image data, there is a high possibility that a shape of the joining part 2b is erroneously recognized compared with a case of using the high-angle maximum luminance image data.

Although the illustration is omitted, the inventor of the present invention confirms that the similar result is obtained also in a case where the images indicated by the intermediate-angle maximum luminance image data and the intermediate-angle minimum luminance image data are compared and in a case where the images indicated by the intermediate-angle maximum luminance image data and the low-angle maximum luminance image data are compared.

On the basis of the above condition, the specification of the joining part 2b in the joining part specifying processing part 233b is performed based on the high-angle maximum luminance image data or the intermediate-angle maximum luminance image data. Accordingly, the pixel region of the joining part 2b can be specified with a high degree of accuracy. Those pieces of data may be appropriately used depending on a type of a ceramic material constituting the honeycomb structural body 1.

Moreover, the outer part specifying processing part 233c specifies the part outside the honeycomb structural body 1 as the excluded pixel region based on the low-angle minimum luminance image data or the intermediate-angle minimum luminance image data. Exemplarily illustrated as a specific scheme of specification is a way of specifying a pixel region in which a luminance value is equal to or smaller than a predetermined threshold in the low-angle minimum luminance image data or the intermediate-angle minimum luminance image data and which is sufficiently large in comparison with the area of the opening of the first cell 3a.

Figure 23A:
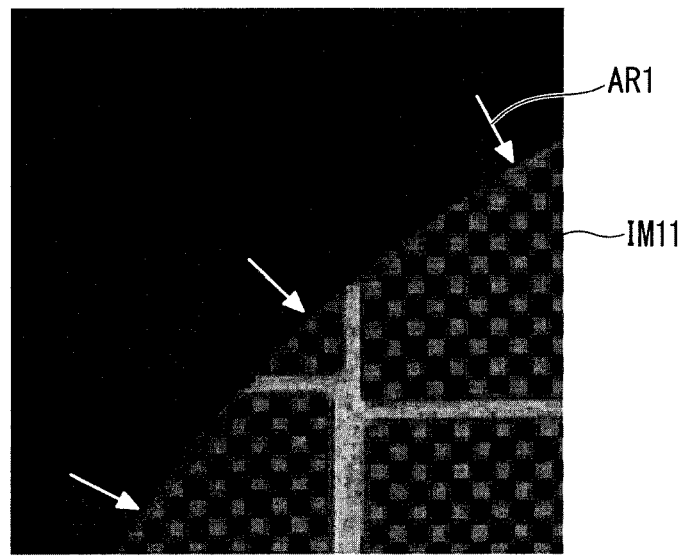
FIGS. 23A and 23B are diagrams exemplarily illustrating images of a part including an outer wall 1w of the honeycomb structural body 1 and an outer side thereof each indicated by synthetic image data in which a scheme of application of a luminance value differs.
Figure 23B:
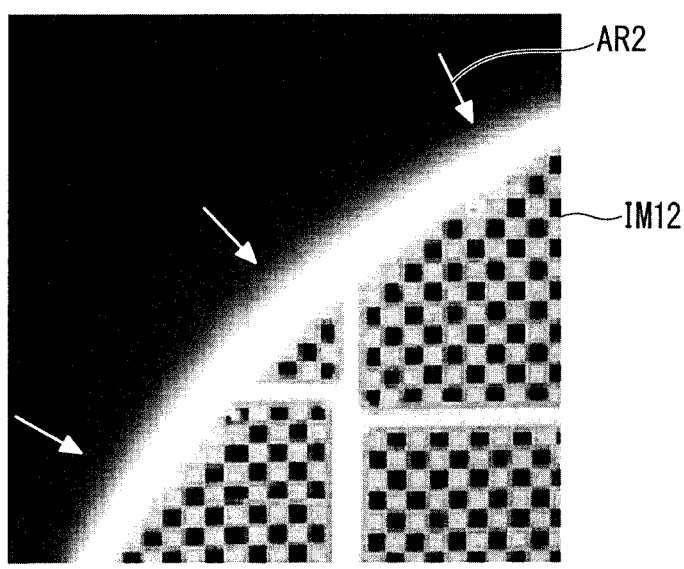

FIGS. 23A and 23B are diagrams exemplarily illustrating images of a part including an outer wall 1w of the honeycomb structural body 1 and an outer side thereof each indicated by synthetic image data in which a scheme of application of a luminance value differs. FIG. 23A illustrates an image IM11 according to the low-angle maximum luminance image data, and FIG. 23B illustrates an image IM12 according to the low-angle maximum luminance image data.

In the image IM11 illustrated in FIG. 23A, as indicated by an arrow AR1, a boundary part between the outer wall 1w of the honeycomb structural body 1 and the outer side of the honeycomb structural body 1, which visually recognized as a uniform dark part, is clearly specified. In the meanwhile, in the image IM12 illustrated in FIG. 23B, as indicated by an arrow AR2, a part near the outer wall 1w of the honeycomb structural body 1 constitutes a band-like dark part, and the boundary part with the outer side of the honeycomb structural body 1 blurs, thus is hardly specified clearly.

Although the illustration is omitted, the inventor of the present invention confirms that the similar result is also obtained in a case where the images indicated by the intermediate-angle minimum luminance image data and the intermediate-angle maximum luminance image data are compared.

On the basis of the above condition, the specification of the part outside the honeycomb structural body 1 in the outer part specifying processing part 233c is performed based on the low-angle minimum luminance image data or the intermediate-angle minimum luminance image data. Accordingly, the pixel region of the part outside the honeycomb structural body 1 can be specified with a high degree of accuracy.

After the excluded pixel region is specified by the opening specifying processing part 233a, the joining part specifying processing part 233b, and the outer part specifying processing part 233c through the above manner, the filter processing part 233d performs the mask processing on the low-angle minimum luminance image data, the intermediate-angle minimum luminance image data, and the high-angle minimum luminance image data using the excluded pixel region. Specifically, the pixel information of the pixel belonging to the excluded pixel region is disabled in those pieces of minimum luminance image data.

[Filter Processing]

Subsequently, the filter processing part 233d performs the various types of filter processing on the low-angle (; intermediate-angle; high-angle) minimum luminance image data in which the excluded pixel region is masked to generate the low-angle (; intermediate-angle; high-angle) determination image data.

Specifically, first, the well-known binarization processing in which a pixel (x, y) is set to be a bright pixel of luminance 1 when the luminance value $B_{4(x,y)}$ (; $B_{5(x,y)}$; $B_{6(x,y)}$) at the pixel (x, y) is equal to or larger than a predetermined luminance threshold, and a pixel (x, y) is set to be a dark pixel of luminance 0 when the luminance value $B_{4(x,y)}$ $B_{5(x,y)}$; $B_{6(x,y)}$) is smaller than the predetermined luminance threshold is performed. The pixel set to be a bright pixel at this stage is excluded from targets of the following determination processing. Hereinafter, a region in which dark pixels are continuous is also referred to as a dark part or a dark region.

Subsequently, the well-known closing processing (expansion-contraction processing) is performed for the dark part, so that a dark part discretely existing as a noise component in image data after the binarization processing and having a small region area (including a small number of pixels) is excluded from targets of the following determination processing.

As described above, image data as a processing target includes a dark part attributable to the normal surface irregularities ns that exist on the ceramic surface 6 and cause no problem in terms of product specifications in some cases. Such a dark part has a relatively small region area, and is thus mostly excluded from targets of the determination processing through the closing processing.

Lastly, to identify any dark part remaining after the closing processing, the well-known labeling processing of associating all dark parts with identification information for uniquely identifying each dark part is performed.

The low-angle determination image data, the intermediate-angle determination image data, and the high-angle determination image data obtained through the filter processing described above are subjected to the determination by the defect determination part 240.

[Determination Processing]

Figure 24:
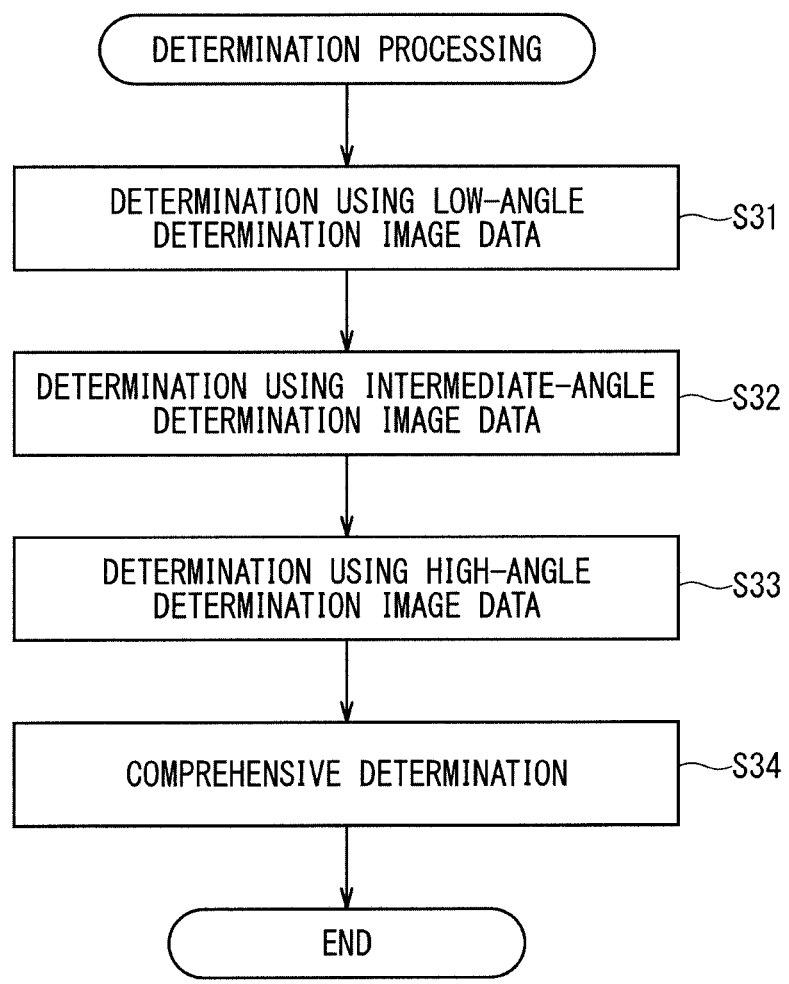
FIG. 24 is a diagram illustrating a process of determination processing performed by a defect determination part 240.

FIG. 24 is a diagram illustrating the process of the determination processing performed by the defect determination part 240. As illustrated in FIG. 24, in the defect inspecting apparatus 1000 according to the present embodiment, determination (steps S31 to S33) based on the low-angle determination image data, the intermediate-angle determination image data, and the high-angle determination image data generated by the filter processing part 233d of the determination image generation part 233 is sequentially performed. Each kind of determination processing is referred to as low-angle determination processing, intermediate-angle determination processing, and high-angle determination processing.

Existence of a defect is comprehensively determined based on results of the determination processing in the low-angle determination processing, the intermediate-angle determination processing, and the high-angle determination processing (step S34). A result of the determination is provided as determination result data from the defect determination part 240 to the integrated control part 210 as appropriate. When a defect is determined to exist at any place of the inspection target region through at least one of the low-angle determination processing, the intermediate-angle determination processing, and the high-angle determination processing, the defect determination part 240 determines that a defect exists at the inspection target region.

Schematically, in the low-angle (; intermediate-angle; high-angle) determination processing, the low-angle (; intermediate angle; high-angle) determination image data to be inspected and a predetermined determination threshold are cross-checked, and it is determined whether or not there is the labeled dark part SD, which is included in the low-angle (; intermediate-angle; high-angle) determination image data, having an area equal to or larger than the determination threshold (more specifically, the number of pixels corresponding to the area). When there is no dark part SD having the area equal to or larger than the determination threshold in the low-angle determination image data, the intermediate-angle determination data, and the high-angle determination image data, it is determined that the defect is not detected. In the meanwhile, when there is such a dark part SD in any of the low-angle determination image data, the intermediate-angle determination data, and the high-angle determination image data, it is determined that there is some defect.

FIG. 25 is a diagram for description in more detail of a content of determination processing performed by the defect determination part 240. FIG. 25 illustrates a list of determination examples through the low-angle determination processing, the intermediate-angle determination processing, and the high-angle determination processing for the normal surface irregularity ns of the ceramic surface 6, the crack df1, and the scoop df3 (refer to FIGS. 3A to 3D, for example) and comprehensive determination contents based on the determination examples. Since the determination is performed for a chip in the manner similar to that for a scoop, FIG. 25 representatively indicates a determination example for a scoop. More specifically, determination examples in two ways of a shallow scoop df3a and a deep scoop df3b are indicated for the scoop df3, however, the terms of "shallow" and "deep" indicate relative states, thus do not clearly make a sharp distinction based on specific characteristics of shape.

In FIG. 25, "OK" in a determination column means that a detection as a defect is not made, and "NG" means that a detection as a defect is made. However, the description of "(OK)" in the determination column indicates that it is erroneously determined that there is no defect according to a determination standard even though a detection as a defect should be originally made.

More specifically, shown in a column of "low-angle determination processing" in FIG. 25 are conditions of the normal surface irregularity ns, the crack df1, and the scoops df3a and df3b in a state where one low-angle illumination element 116 (irradiation direction D1) is an on-state, conditions of the normal surface irregularity ns, the crack df1, and the scoops df3a and df3b in the low-angle determination image expressed by the low-angle determination image data generated based on the m0 pieces of low-angle captured image data, and determination results based on those conditions. The determination in the low-angle determination processing is performed by comparing a size of the dark part region appearing in the low-angle determination image and a size of a threshold region TH0 corresponding to the determination threshold in the low-angle determination processing.

Similarly, shown in a column of "intermediate-angle determination processing" are conditions of the normal surface irregularity ns, the crack df1, and the scoops df3a and df3b in a state where one intermediate-angle illumination element 121 (irradiation direction D1) is an on-state, conditions of the normal surface irregularity ns, the crack df1, and the scoops df3a and df3b in the intermediate-angle determination image expressed by the intermediate-angle determination image data generated based on the m1 pieces of intermediate-angle captured image data, and determination results based on those conditions. The determination in the intermediate-angle determination processing is performed by comparing a size of the dark part region appearing in the intermediate-angle determination image and a size of a threshold region TH1 corresponding to the determination threshold in the intermediate-angle determination processing.

Moreover, shown in a column of "high-angle determination processing" are conditions of the normal surface irregularity ns, the crack df1, and the scoops df3a and df3b in a state where one high-angle illumination element 131 (irradiation direction D2) is an on-state, conditions of the normal surface irregularity ns, the crack df1, and the scoops df3a and df3b in the determination image expressed by the high-angle determination image data generated based on the m2 pieces of high-angle captured image data, and determination results based on those conditions. The determination in the high-angle determination processing is performed by comparing a size of the dark part region appearing in the high-angle determination image and a size of a threshold region TH2 corresponding to the determination threshold in the high-angle determination processing.

In such a case, the determination thresholds (the sizes of the threshold regions TH0 and TH1) in the low-angle determination processing and the intermediate-angle determination processing are set to values so that the normal surface irregularity ns is not erroneously detected as a defect but the scoop or the chip which is a defect relatively having a small depth and a large width can be reliably detected. The low-angle determination process is performed with an intention to reliably detect a relatively shallow scoop or chip which cannot be sufficiently detected in the intermediate-angle determination processing.

In contrast, the determination threshold (the size of the threshold region TH2) in the high-angle determination process is mainly set to a value so that a crack which is a defect relatively having a large depth and a small width can be detected. Specifically, the determination threshold is set to a value smaller than the determination threshold in the low-angle determination processing and the intermediate-angle determination processing. The high-angle determination image data used in the high-angle determination processing derives from the high-angle captured image data obtained by image capturing using the high-angle illumination part 130 as the illumination light source, thus there is rarely the dark part SD due to normal surface irregularities, a scoop, and a chip in the high-angle determination image. Thus, even when the determination threshold is defined as described above, the erroneous determination that the normal surface irregularities are determined to be the defect hardly occurs in the high-angle determination processing.

On the basis of the above condition, the contents of the determination for each shape in FIG. 25 are confirmed.

Firstly, in the case of the normal surface irregularities ns, it is supposed that a shadow part A occurring at a time when the individual low-angle illumination elements 116 are sequentially turned on is synthesized, thus a shadow region A' is formed in the low-angle determination image. The similar shadow region A' may be formed in the intermediate-angle determination image in some cases. However, such a shadow region A' is smaller than the threshold region TH0 in the low-angle determination processing and the threshold region TH1 in the intermediate-angle determination processing (more specifically, the determination threshold is defined to satisfy such a relationship), thus is not detected as a defect.

The angle θ2 between the irradiation direction D2 of the high-angle illumination element 131 and the horizontal plane is larger than the angle θ1 between the irradiation direction D1 of the intermediate-angle illumination element 121 and a horizontal plane, thus the shadow region is not generally formed in the surface irregularities ns in the high-angle determination image. Even if the shadow region is formed, the shadow region is smaller than the threshold region TH2 in the high-angle determination processing.

Thus, the normal surface irregularities are not erroneously detected (erroneously determined) as the defect in any of the low-angle determination processing, the intermediate-angle determination processing, and the high-angle determination processing.

Next, in the case of the crack df1, it is supposed that a shadow part B occurs when each of the individual low-angle illumination elements 116, the intermediate-angle illumination elements 121, and the high-angle illumination elements 131 are sequentially turned on. The shadow part B is synthesized, thus a shadow region B' is formed in the low-angle determination image, the intermediate-angle determination image, and the high-angle determination image.

Herein, sizes of the shadow region B' formed in the low-angle determination image and the intermediate-angle determination image may be smaller than the size of the threshold region TH0 in the low-angle determination processing and the size of the threshold region TH1 in the intermediate-angle determination processing, which are defined to prevent the erroneous detection of the surface irregularities ns in some cases. In this case, the crack df1 is not detected as a defect in the low-angle determination processing and the intermediate-angle determination processing. That is to say, this means that when only these determination results of the low-angle determination processing and the intermediate-angle determination processing are referred, the erroneous determination occurs for the crack df1.

However, the size of the shadow region B' deriving from the crack is larger than that of the threshold region TH2 in the high-angle determination image (more specifically, the determination threshold is defined to satisfy such a relationship), thus even if the crack df1 is not detected as a defect in the low-angle determination processing and the intermediate-angle determination processing, the crack df1 is detected as a defect in the high-angle determination processing.

That is to say, the crack is detected as the defect at least in the high-angle determination processing even if the crack is not detected as the defect in the low-angle determination processing and the intermediate-angle determination processing. When the shadow region B' of the crack is larger than the threshold region TH0 or the threshold region TH1 in the low-angle determination processing and the intermediate-angle determination processing, it is obvious that the crack is detected as the detect at the time of the low-angle determination processing and the intermediate-angle determination processing.

More specifically, when a detect which is apparently a crack is detected in the high-angle determination processing, an illumination value of the detection region in the high-angle maximum illumination image data is referred as confirmation. If the referred illumination value is larger enough not to be recognized as a value in the dark part, it is determined that there is no defect in the detected region.

In the case of scoop df3 (df3*a*, df3*b*), a difference may occur in the scheme of the formation of the shadow region in the determination image depending on the depth of the scoop and the irradiation angle of the illumination light.

The width is relatively large but the depth is shallow compared with the crack df1, thus the shadow region is hardly formed in the high-angle determination image in both the shallow scoop df3*a* and the deep scoop df3*b*. Thus, it is hard to detect the scoop df3 based on the high-angle determination image. In other words, it is erroneously determined that there is no scoop in the high-angle determination processing.

In the meanwhile, the shadow region is formed in the low-angle determination image and the intermediate-angle determination image. Herein, as illustrated in FIG. 25, it is supposed that, when each of the individual low-angle illumination elements 116 and the intermediate-angle illumination elements 121 is sequentially turned on, a shadow part C occurs in accordance with the shallow scoop df3*a*, and a shadow part D occurs in accordance with the scoop df3*b*. Then, it is also supposed that the shadow part C and the shadow part D are synthesized, thus a shadow region C' and a shadow region D' are formed in the low-angle determination image and the intermediate-angle determination image.

At this time, in the low-angle determination image in which the irradiation angle of the illumination light at image capturing is small, the shadow region C' and the shadow region D' are formed over the whole range corresponding to the original scoops df3a and df3b, respectively. In the meanwhile, in the intermediate-angle determination image, the shadow region D' is formed in a range corresponding to the original scoop df3b, however, the shadow region C' is formed only in an end part (a peripheral part) of the original scoop df3a, in some cases.

Thus, at least the deep scoop df3b can be detected by appropriately defining the threshold region TH1 in the intermediate-angle determination processing, however, the low-angle determination processing is effective from a viewpoint of reliably detecting the shallow scoop df3a.

According to only the example illustrated in FIG. 25, it seems that the scoop and the chip can be apparently detected by only the low-angle determination processing, however, the low-angle determination processing and the intermediate-angle determination processing are practically used together, from a viewpoint of reliably detecting scoops and chips having various shapes.

Existence of a defect is comprehensively determined based on results of the determination processing in the low-angle determination processing, the intermediate-angle determination processing, and the high-angle determination processing in the defect determination part 240. Specifically, when the determination is NG in any determination processing, it is determined that there is some defect in the end face 1a of the honey structural body 1 to be inspected.

As described above, the determination threshold providing the threshold regions TH0, TH1, and TH2 is appropriately defined in accordance with the scoop, the chip, and the crack to be detected, thus as illustrated in FIG. 25, the scoop and the chip are detected in the low-angle determination processing and/or the intermediate-angle determination processing even if the scoop and the chip are not detected in the high-angle determination processing. The crack is not detected by the low-angle determination processing and the intermediate-angle determination processing, but is detected by the high-angle determination processing. Thus, "NG" is described in the column of "comprehensive determination" for each of them.

In contrast, the normal surface irregularities are not erroneously detected as the defect in any determination processing, thus "OK" is described in the column of "comprehensive determination".

A result of the determination described above is provided as determination result data from the defect determination part 240 to the integrated control part 210 as appropriate. The integrated control part 210 makes the display part 202 display the result of the defect determination based on the description contents of the determination result data provided from the defect determination part 240. Various formats can be adopted to a display form thereof. For example, applicable is a format of displaying only existence of a defect at an inspection target region or a format of displaying a position of a defect based on a result of labeling processing. Alternatively, also applicable is a format of displaying a size of a defect based on an area (the number of pixels) of a dark part.

As described above, according to the present embodiment, in the inspection of existence of the defect at the end face of the ceramic honeycomb structural body is inspected, the determination image data is generated based on the plural pieces of captured image data obtained by varying the irradiation directions of the illumination light with three levels of irradiation angles of illumination light, and existence of the defect is determined using the three types of obtained determination image data, thus the defect which should be originally detected can be reliably detected without erroneously detecting the irregularities on the normal ceramic surface as the defect.

Furthermore, the pixel region corresponding to the part which needs not be inspected, such as the cell opening located in the image captured region, the joining part of the honeycomb segment, and the part outside the honeycomb structural body, is specified in advance based on the image data appropriate for the specification of each part in the synthesis image data generated based on the maximum illuminance or the minimum illuminance of the plural pieces of captured image data in advance of the generation of each determination image data, and the determination image data is generated to exclude the pixel region from the inspection target as the excluded pixel region, thus the defect inspection can be performed more effectively.

Modification Example

In the embodiment described above, the defect inspecting apparatus 1000 includes the three illumination parts of the low-angle illumination part 115 having the irradiation angle θ0 of preferably 5° to 30°, the intermediate-angle illumination part 120 having the irradiation angle θ1 of preferably 30° to 60°, and the high-angle illumination part 130 having the irradiation angle θ2 of preferably 60° to 85°, and the image capturing in which the illumination light is emitted from each illumination part is sequentially performed, however, also applicable is a configuration of providing at least one of the illumination parts with varied illumination angles at multiple levels, thus four or more illumination parts are included as a whole. In other words, at least one of the low-angle illumination part 115, the intermediate-angle illumination part 120, and the high-angle illumination part 130 may be made up of two or more illumination parts each having an illumination angle different from each other. In such a case, the synthesis image data corresponding to the number of illumination parts and furthermore, the determination image data is generated, and the determination processing at a level corresponding to the number of illumination parts is performed.

In the embodiment described above, as illustrated in FIG. 13, the image capturing using the low-angle illumination part 115, the image capturing using the intermediate-angle illumination part 120, and the image capturing using the high-angle illumination part 130 are performed in this order, this order can be replaced with each other. In this case, the order of the corresponding determination processing may be replaced.

When the size of the honeycomb structural body 1 is small compared with the capturing range of the camera 110, image capturing using the low-angle illumination part 115 and the series of processing up to the following low-angle determination processing based on the low-angle captured image data obtained through the image capturing may be omitted at defect inspection using the defect inspecting apparatus 1000, as long as the accuracy of inspection is maintained.

The embodiment described above does not prevent the defect inspecting apparatus 1000 from inspecting the honeycomb structural body 1 which does not have the joining part 2b. In this case, the joining part specifying processing part 233b does not specify the joining part 2b, however, the defect inspection itself is performed in the manner similar to that in the embodiment described above. When it is determined in advance that the honeycomb structural body 1 which does not have the joining part 2b is subjected to a defect inspection, the function of the joining part specifying processing part 233b may be suspended.

The invention claimed is:

1. A ceramic body defect inspecting apparatus configured to inspect existence of a defect on an outer surface of a ceramic body, the apparatus comprising:
   a table on which a ceramic body as an inspection target is to be placed;
   an image capturing part configured to capture at least part of an inspection target surface of the ceramic body placed on the table as an image captured region in a normal direction of the inspection target surface;
   a low-angle illumination part, an intermediate-angle illumination part, and a high-angle illumination part each including a plurality, which is four or more, of illumination elements obliquely irradiating the image captured region with illumination light in irradiation directions different from each other and equiangularly spaced around the image capturing part;
   a determination image generation part configured to generate determination image data for determining existence of a defect in the image captured region based on captured image data acquired by the image capturing part; and
   a defect determination part configured to determine existence of a defect based on the determination image data, wherein
   the plurality of illumination elements included in the low-angle illumination part have an irradiation angle θ0 of 5° to 30°,
   the plurality of illumination elements included in the intermediate-angle illumination part have an irradiation angle θ1 of 30° to 60°,
   the plurality of illumination elements included in the high-angle illumination part have an irradiation angle θ2 of 60° to 85°,
   values of θ0, θ1, and θ2 are different from each other,
   the plurality of illumination elements are sequentially turned on and off in each of the low-angle illumination part, the intermediate-angle illumination part, and the high-angle illumination part,
   the image capturing part captures an image of the image captured region every time the plurality of illumination elements in each of the low-angle illumination part, the intermediate-angle illumination part, and the high-angle illumination part are turned on, thereby generating plural pieces of low-angle illumination captured image data, plural pieces of intermediate-angle illumination captured image data, and plural pieces of high-angle illumination captured image data,
   the determination image generation part includes:
   the maximum/minimum luminance image generation part generating low-angle maximum luminance image data, intermediate-angle maximum luminance image data, and high-angle maximum luminance image data, by respectively synthesizing the plural pieces of low-angle illumination captured image data, the plural pieces of intermediate-angle illumination captured image data, and the plural pieces of high-angle illumination captured image data so that a maximum luminance value for each pixel position in the plural pieces of the synthesized data is set to a luminance value for the pixel position in the generated data, and generating low-angle minimum luminance image data, intermediate-angle minimum luminance image data, and high-angle minimum luminance image data, by respectively synthesizing the plural pieces of low-angle illumination captured image data, the plural pieces of intermediate-angle illumination captured image data, and the plural pieces of high-angle illumination captured image data so that a minimum luminance value for each pixel position in the plural pieces of the synthesized data is set to a luminance value for the pixel position in the generated data; and
   an excluded region specifying part specifying an excluded pixel region in an image expressed by each of the low-angle minimum luminance image data, the intermediate-angle minimum luminance image data, and the high-angle minimum luminance image data based on at least one of the low-angle maximum luminance image data, the intermediate-angle maximum luminance image data, the high-angle maximum luminance image data, the low-angle minimum luminance image data, the intermediate angle minimum luminance image data, and the high-angle minimum luminance image data,
   the excluded pixel region corresponds to a region not inspected in the image captured region,
   each of low-angle determination image data, intermediate determination image data, and high-angle determination image data is generated as the determination image data based on the low-angle minimum luminance image data, the intermediate-angle minimum luminance image data, and the high-angle minimum luminance image data disabled for the excluded pixel region, and
   the defect determination part determines existence of a defect in the image captured region other than the excluded pixel region based on the low-angle determination image data, the intermediate-angle determination image data, and the high-angle determination image data.

2. The ceramic body defect inspecting apparatus according to claim 1, wherein
   the ceramic body is a honeycomb structural body and the inspection target surface is an end face of the honeycomb structural body,
   the excluded region specifying part includes at least one of:
   an opening specifying processing part specifying a pixel position in the determination image data for a cell opening at the end face of the honeycomb structural body in the image captured region;
   a joining part specifying processing part specifying a pixel position in the determination image data for a joining part of a honeycomb segment at the end face of the honeycomb structural body in the image captured region; and
   an outer part specifying processing part specifying a pixel position in the determination image data for a part outside the honeycomb structural body in the image captured region.

3. The ceramic body defect inspecting apparatus according to claim 2, wherein
   the excluded region specifying part includes the opening specifying processing part, and
   the opening specifying processing part specifies a pixel region in the determination image data corresponding to the cell opening included in the image captured region as the excluded pixel region based on the low-angle maximum luminance image data or the intermediate-angle maximum luminance image data.

4. The ceramic body defect inspecting apparatus according to claim 2, wherein
the excluded region specifying part includes the joining part specifying processing part, and
the joining part specifying processing part specifies a pixel region in the determination image data of the joining part included in the image captured region as the excluded pixel region based on the intermediate-angle maximum luminance image data or the high-angle maximum luminance image data.

5. The ceramic body defect inspecting apparatus according to claim 2, wherein
the excluded region specifying part includes the outer part specifying processing part, and
the outer part specifying processing part specifies a pixel region in the determination image data of the part outside the honeycomb structural body included in the image captured region as the excluded pixel region based on the low-angle minimum luminance image data or the intermediate-angle minimum luminance image data.

6. The ceramic body defect inspecting apparatus according to claim 1, further comprising
a luminance correction processing part correcting luminance of the plural pieces of low-angle illumination captured image data, the plural pieces of intermediate-angle illumination captured image data, and the plural pieces of high-angle illumination captured image data, wherein
the maximum/minimum luminance image generation part generates the low-angle maximum luminance image data, the intermediate-angle maximum luminance image data, the high-angle maximum luminance image data, the low-angle minimum luminance image data, the intermediate-angle minimum luminance image data, and the high-angle minimum luminance image data based on the plural pieces of low-angle illumination captured image data, the plural pieces of intermediate-angle illumination captured image data, and the plural pieces of high-angle illumination captured image data in which luminance has been corrected by the luminance correction processing part.

7. The ceramic body defect inspecting apparatus according to claim 1, wherein
the determination image generation part generates the determination image data as binarized data, and
the defect determination part determines that there is a defect in the image captured region when the determination image data includes a dark part having pixels equal to or larger in number than a predetermined threshold.

8. The ceramic body defect inspecting apparatus according to claim 1, wherein
each of the plurality of illumination elements in at least one of the low-angle illumination part, the intermediate-angle illumination part, and the high-angle illumination part is made up of at least two dimming units individually dimmable.

9. The ceramic body defect inspecting apparatus according to claim 1, wherein
the plurality of illumination elements of each of the low-angle illumination part, the intermediate-angle illumination part, and the high-angle illumination part are supported by one support body, and the plurality of illumination elements of the low-angle illumination part, the plurality of illumination elements of the intermediate-angle illumination part, and the plurality of illumination elements of the high-angle illumination part are arranged in a plane different from each other, respectively.

10. The ceramic body defect inspecting apparatus according to claim 1, wherein
the plurality of illumination elements of each of the low-angle illumination part, the intermediate-angle illumination part, and the high-angle illumination part are eight illumination elements.

11. A method of inspecting existence of a defect on an outer surface of a ceramic body, the method comprising:
a placement step of placing a ceramic body as an inspection target on a predetermined table;
an image capturing step of generating plural pieces of captured image data by capturing, through predetermined image capturing means, at least part of an inspection target surface of the ceramic body placed on the table as an image captured region in a normal direction of the inspection target surface;
a determination image generation step of generating determination image data for determining existence of a defect in the image captured region based on plural pieces of captured image data obtained in the image capturing step; and
a defect determination step of determining existence of a defect based on the determination image data, wherein
in the image capturing step, a low-angle illumination part, an intermediate-angle illumination part, and a high-angle illumination part each including a plurality, which is four or more, of illumination elements obliquely irradiating the image captured region with illumination light in irradiation directions different from each other and equiangularly spaced around the image capturing part are arranged in a state where:
the plurality of illumination elements included in the low-angle illumination part have an irradiation angle $\theta 0$ of 5° to 30°;
the plurality of illumination elements included in the intermediate-angle illumination part have an irradiation angle $\theta 1$ of 30° to 60°;
the plurality of illumination elements included in the high-angle illumination part have an irradiation angle $\theta 2$ of 60° to 85°; and
values of $\theta 0$, $\theta 1$, and $\theta 2$ are different from each other,
the image capturing means captures an image of the image captured region every time the plurality of illumination elements in each of the low-angle illumination part, the intermediate-angle illumination part, and the high-angle illumination part are turned on and off, thereby generating plural pieces of low-angle illumination captured image data, plural pieces of intermediate-angle illumination captured image data, and plural pieces of high-angle illumination captured image data,
the determination image generation step includes:
a maximum/minimum luminance image generation step of generating low-angle maximum luminance image data, intermediate-angle maximum luminance image data, and high-angle maximum luminance image data, by respectively synthesizing the plural pieces of low-angle illumination captured image data, the plural pieces of intermediate-angle illumination captured image data, and the plural pieces of high-angle illumination captured image data so that a maximum luminance value for each pixel position in the plural pieces of the synthesized data is set to a luminance value for the pixel position in the generated data, and generating low-angle minimum luminance image data, intermediate-angle minimum luminance image data, and high-angle minimum luminance image data, by respectively synthesizing the plural pieces of low-angle illumination captured image data, the plural pieces of intermediate-angle illumination captured image data, and the plural pieces of high-angle illumination captured image data so that a minimum luminance value for each pixel position in the plural pieces of the synthesized data is set to a luminance value for the pixel position in the generated data; and an excluded region specifying step of specifying an excluded pixel region in an image expressed by each of the low-angle minimum luminance image data, the intermediate-angle minimum luminance image data, and the high-angle minimum luminance image data based on at least one of the low-angle maximum luminance image data, the intermediate-angle maximum luminance image data, the high-angle maximum luminance image data, the low-angle minimum luminance image data, the intermediate angle minimum luminance image data, and the high-angle minimum luminance image data; and a generation step of generating each of low-angle determination image data, intermediate determination image data, and high-angle determination image data as the determination image data based on the low-angle minimum luminance image data, the intermediate-angle minimum luminance image data, and the high-angle minimum luminance image data disabled for the excluded pixel region, and the excluded pixel region corresponds to a region not inspected in the image captured region, in the defect determination step, existence of a defect in the image captured region other than the excluded pixel region is determined based on the low-angle determination image data, the intermediate-angle determination image data, and the high-angle determination image data.

12. The ceramic body defect inspecting method according to claim 11, wherein the ceramic body is a honeycomb structural body and the inspection target surface is an end face of the honeycomb structural body, the excluded region specifying step includes at least one of:

an opening specifying processing step of specifying a pixel position in the determination image data for a cell opening at the end face of the honeycomb structural body included in the image captured region;

a joining part specifying processing step of specifying a pixel position in the determination image data for a joining part of a honeycomb segment at the end face of the honeycomb structural body in the image captured region; and an outer part specifying processing step of specifying a pixel position in the determination image data for a part outside the honeycomb structural body in the image captured region.

13. The ceramic body defect inspecting method according to claim 12, wherein the excluded region specifying step includes the opening specifying processing step, and in the opening specifying processing step, a pixel position in the determination image data of the cell opening included in the image captured region is specified based on the low-angle maximum luminance image data or the intermediate-angle maximum luminance image data.

14. The ceramic body defect inspecting method according to claim 12, wherein the excluded region specifying step includes the joining part specifying processing step, and in the joining part specifying processing step, a pixel position in the determination image data of the joining part included in the image captured region is specified based on the intermediate-angle maximum luminance image data or the high-angle maximum luminance image data.

15. The ceramic body defect inspecting method according to claim 12, wherein the excluded region specifying step includes the outer part specifying processing step, and in the outer part specifying processing step, a pixel position in the determination image data of the part outside the honeycomb structural body included in the image captured region is specified based on the low-angle minimum luminance image data or the intermediate-angle minimum luminance image data.

16. The ceramic body defect inspecting method according to claim 11, further comprising a luminance correction processing step of correcting luminance of the plural pieces of low-angle illumination captured image data, the plural pieces of intermediate-angle illumination captured image data, and the plural pieces of high-angle illumination captured image data, wherein in the maximum/minimum luminance image generation step, the low-angle maximum luminance image data, the intermediate-angle maximum luminance image data, the high-angle maximum luminance image data, the low-angle minimum luminance image data, the intermediate-angle minimum luminance image data, and the high-angle minimum luminance image data are generated based on the plural pieces of low-angle illumination captured image data, the plural pieces of intermediate-angle illumination captured image data, and the plural pieces of high-angle illumination captured image data in which luminance has been corrected in the luminance correction processing step.

17. The ceramic body defect inspecting method according to claim 11, wherein in the generation step, the determination image data is generated as binarized data, and in the defect determination step, it is determined that there is a defect in the image captured region when the determination image data includes a dark part having pixels equal to or larger in number than a predetermined threshold.

18. The ceramic body defect inspecting method according to claim 11, wherein each of the plurality of illumination elements in at least one of the low-angle illumination part, the intermediate-angle illumination part, and the high-angle illumination part is made up of at least two dimming units individually dimmable, and luminance difference in accordance with difference between distances from at least one of the plurality of low-angle illumination elements, the plurality of intermediate-angle illumination elements, and the plurality of high-angle illumination elements in a capturing range of the image capturing means is reduced by individually dimming the at least two dimming units in advance before image capturing by the image capturing means in the image capturing step.

19. The ceramic body defect inspecting method according to claim 11, wherein
the plurality of illumination elements of each of the low-angle illumination part, the intermediate-angle illumination part, and the high-angle illumination part are eight illumination elements.

\* \* \* \* \*